United States Patent [19]
Kirk et al.

[11] Patent Number: 5,768,578
[45] Date of Patent: Jun. 16, 1998

[54] USER INTERFACE FOR INFORMATION RETRIEVAL SYSTEM

[75] Inventors: Thomas Kirk, Warren; Alon Yitzchak Levy, Berkeley Heights, both of N.J.

[73] Assignee: Lucent Technologies Inc., Murray Hill, N.J.

[21] Appl. No.: 394,867

[22] Filed: Feb. 27, 1995

Related U.S. Application Data

[63] Continuation-in-part of Ser. No. 347,016, Nov. 30, 1994, Pat. No. 5,600,831, which is a continuation-in-part of Ser. No. 203,082, Feb. 28, 1994.

[51] Int. Cl.⁶ ..................................... G06F 17/30
[52] U.S. Cl. .................. 395/611; 395/603; 395/614; 395/615; 395/777; 395/793
[58] Field of Search .................. 395/600, 611, 395/603, 614, 615, 777, 793; 364/900, 523

[56] References Cited

U.S. PATENT DOCUMENTS

| | | | |
|---|---|---|---|
| 4,408,302 | 10/1983 | Fessel et al. | 364/900 |
| 4,933,880 | 6/1990 | Borgendale et al. | 364/523 |
| 5,021,989 | 6/1991 | Fujisawa et al. | 364/900 |
| 5,117,349 | 5/1992 | Tirfing et al. | 395/600 |
| 5,315,703 | 5/1994 | Matehny et al. | 395/164 |
| 5,355,320 | 10/1994 | Erjavic et al. | 364/488 |
| 5,379,366 | 1/1995 | Noyes | 395/54 |
| 5,388,196 | 2/1995 | Pajak et al. | 395/153 |
| 5,408,655 | 4/1995 | Oren et al. | 395/600 |

OTHER PUBLICATIONS

T. Topaloglou, et al., "Query Optimization for KBMSs: Temporal, Syntactic and Semantic Transformations", IEEE, 1992, pp. 310–319.

Y. Arens, et al., "Retrieving and Integrating Data from Multiple Information Sources", International Journal of Intelligence and Cooperative Information Systems, vol. 2, No. 2, published 1993, pp. 127–158.

Yigal Arens et al., "Retrieving And Integrating Data From Multiple Information Sources", International Journal on Intelligence and Cooperative Information Systems, vol. 2, No. 2, pp. 1–31, 1993.

*Primary Examiner*—Thomas G. Black
*Assistant Examiner*—Cheryl Lewis
*Attorney, Agent, or Firm*—J. M. Weinick

[57] ABSTRACT

An improved information retrieval system user interface for retrieving information from a plurality of sources and for storing information source descriptions in a knowledge base. The user interface includes a hypertext browser and a knowledge base browser/editor. The hypertext browser allows a user to browse an unstructured information space through the use of interactive hypertext links. The knowledge base browser/editor displays a directed graph representing a generalization taxonomy of the knowledge base, with the nodes representing concepts and edges representing relationships between concepts. The system allows users to store information source descriptions in the knowledge base via graphical pointing means. By dragging an iconic representation of an information source from the hypertext browser to a node in the directed graph, the system will store an information source description object in the knowledge base. The knowledge base browser/editor is also used to browse the information source descriptions previously stored in the knowledge base. The result of such browsing is an interactive list of information source descriptions which may be used to retrieve documents into the hypertext browser. The system also allows for querying a structured information source and using query results to focus the hypertext browser on the most relevant unstructured data sources.

20 Claims, 8 Drawing Sheets

FIG. 3

Algorithm GenerateSubPlan $(E(\bar{W}), C(\bar{W}), SD)$
$E(\bar{W})$ is a query on a single world-view relation. $C(\bar{W})$ is a constraint on the tuples that need to be computed, and SD is the collection of site descriptions. The output is a collection of sub-plans, one for each of the relevant site descriptions in SD.
The following steps are performed for each site description $SD \in SD$.

1. If SD is of the form (1) or (2), i.e., $$C_R(\bar{Y}), R_1(\bar{X}_1), \ldots, R_k(\bar{X}_k) \subseteq C_E(\bar{W}), E(\bar{W})$$
$$C_R(\bar{Y}), R_1(\bar{X}_1), \ldots, R_k(\bar{X}_k) = C_E(\bar{W}), E(\bar{W})$$

and $C(\bar{W}) \wedge C_E(\bar{W})$ is satisfiable, generate a sub-plan for answering a fragment of E using traditional query optimization techniques on the conjunctive query:

$$\pi_{\bar{W}}(\sigma_{C_R(\bar{Y}) \wedge C(\bar{W})}(R_1(\bar{X}_1) \bowtie \ldots \bowtie R_k(\bar{X}_k))).$$

2. If SD is of the form (3) or (4), i.e., $$C_R(\bar{X}), R(\bar{X}) \subseteq C_E(\bar{Y}), E_1(\bar{X}_1), \ldots, E(\bar{W}), \ldots, E_k(\bar{X}_k)$$
$$C_R(\bar{X}), R(\bar{X}) = C_E(\bar{Y}), E_1(\bar{X}_1), \ldots, E(\bar{W}), \ldots, E_k(\bar{X}_k)$$

$C_E(\bar{Y}) \wedge C(\bar{W})$ is satisfiable, and $\bar{X}$ (the variables of the site relation R) contain the variables of $\bar{W}$, generate a sub-plan for answering a fragment of E using traditional query optimization techniques on the conjunctive query:

$$\pi_{\bar{W}}(\sigma_{C_R(\bar{X}) \wedge C(\bar{W})}(R(\bar{X}))).$$

3. In the case when E is a unary concept relation, we perform the first two steps for concept relations E' that are subconcepts of E.

Algorithm DynamicPlanEval (Q($\bar{X}$),SD)
(Q($\bar{X}$) is the query, and SD is the collection of site descriptions.

1. Determine an order $E_1(\bar{X}_1),\ldots,E_k(\bar{X}_k)$ of joining the conjuncts in Q($\bar{X}$). Let $P_i$, $0 \leq i \leq k$ denote a set of pairs of the form ($\bar{t},C(\bar{Y})$), where $\bar{t}$ is a tuple in the join of relations $E_1,\ldots,E_i$, and $C(\bar{Y})$ is a constraint, computed as described below. $P_0$ is defined to have a single pair, whose tuple component has the empty tuple and whose constraint component has $C_0$, the query constraints.

2. Perform the following steps i = 1 to k.

(a) For each tuple ($\bar{t},C(\bar{Y})$) $\in P_{i-1}$ do

405 {
      i. Let $C_i(\bar{X}_i)$ denote the projection of $C(\bar{Y})$ on the variables in $\bar{X}_i$.
      ii. Generate a sub-plan for computing the tuples in the relation $E_i(\bar{X}_i)$ satisfying the constraint $C_i(\bar{X}_i)$, using the site descriptions SD.
   }

407 {
      iii. Let $\bar{t}_i$ be a tuple computed for $E_i$ using a site description SD. Let $C'_i(\bar{X}_i)$ denote the projection of $C_E^{SD} \wedge C_R^{SD}$ on the variables $\bar{X}_i$, where $C_E^{SD}$ and $C_R^{SD}$ are the constraints on the two sides of the site description SD. — 409
      For each tuple $\bar{t}_i$ in $E_i$ and matching $C'_i(\bar{X}_i)$, add the pair ($\bar{t}\cdot\bar{t}_i,C(\bar{Y}) \wedge C'_i(\bar{X}_i)$) to $P_i$, where $\bar{t}\cdot\bar{t}_i$ denotes concatenation of tuples.
   }

3. The answers to the query can be computed from $P_k$ by taking each tuple in the tuple component and projecting it on the variables of Q($\bar{X}$).

---

401

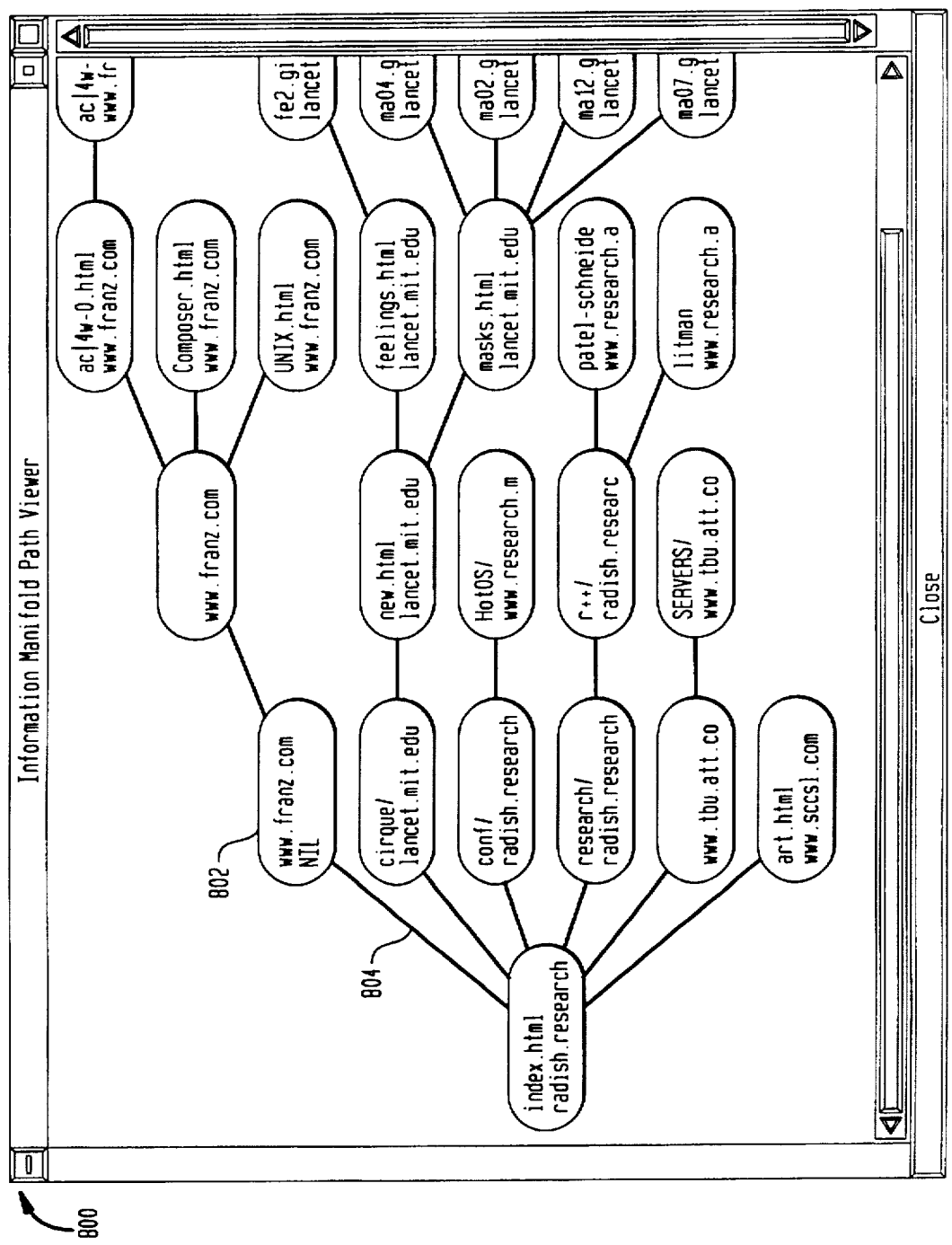

USER INTERFACE FOR INFORMATION RETRIEVAL SYSTEM

RELATED APPLICATIONS

The present application is a continuation-in-part of U.S. patent application Ser. No. 08/347,016, filed Nov. 30, 1994, and now U.S. Pat. No. 5,600,831 which is a continuation-in-part of U.S. patent application Ser. No. 08/203,082, filed Feb. 28, 1994.

FIELD OF THE INVENTION

This invention relates to information retrieval generally. More particularly, the invention relates to an improved information retrieval system user interface.

BACKGROUND OF THE INVENTION

The Internet is a global computer network providing access to a large, distributed body of information. The collection of information accessible throughout this network is generally not organized or indexed, making the task of locating useful information difficult. The difficulty of finding and retrieving information is exacerbated by the multiplicity of protocols used for interacting with information and service providers, numerous formats for different types of multimedia data, and the rapidly growing and changing topology of the network.

The World Wide Web (WWW) is an initiative to simplify navigation of this sea of information. The WWW encompasses a family of Internet protocols and a hypertext data model to enable more convenient access to multimedia data. Hypertext links, which are embedded in the hypertext documents, express relationships among pieces of information, as well as location, format and access method for retrieving the data designated by the link. Software interfaces to the WWW present this data to users in such a way that retrieval of data is performed by simple operations on these hypertext links. These interfaces ease the task of navigation, retrieval, and presentation of information by hiding details of access.

The hypertext model, while simple and convenient to use, does not contribute to creating rational organizations of information. On the contrary, the relationships implied by the links are arbitrary, so the interconnected body of information within the WWW is still mostly unstructured and disorganized. The result is that information retrieval on the WWW is still a laborious and time-consuming process.

One way that existing software interfaces to the WWW (called WWW clients) help with this process is to provide a way to keep track of interesting information sources, by allowing users to save links so that the process of locating the information source does not have to be repeated for future access to the information. In particular, many users find useful information sources that they want to be able to return to easily. The current state of the art of WWW clients allows these links to be recorded in lists. Such lists provide an alternative way to navigate the WWW, allowing direct access to a previously accessed information source. Such a mechanism has proven to be practically essential for effective WWW navigation.

The weakness of this approach is that these lists quickly become unmanageable as they grow in size. Finding previously stored information in a large list can be difficult. Similarly, the lack of the ability to view an overall organization of the information reduces the effectiveness of such lists. In addition, these lists retain minimal information about information sources, typically just a Universal Resource Locator (URL), which can be thought of as an information source address in the WWW, and some text that may or may not accurately describe the contents of the information sources.

The present invention solves the shortcomings of the prior art by providing an improved information retrieval system user interface.

SUMMARY OF THE INVENTION

The present invention provides an improved user interface for an information retrieval system. In the preferred embodiment, the information retrieval system retrieves information from a plurality of information sources and stores information source descriptions in a knowledge base. These information source descriptions contain various attributes which describe the information source.

The interface includes a hypertext browser coupled with a knowledge base browser/editor. The hypertext browser is used to browse an information space, such as the World Wide Web. The knowledge base browser/editor displays a directed graph which represents a generalization taxonomy of the concepts in the knowledge base. When an information source (such as a document) of interest is retrieved, the user may store an information source description in the knowledge base via the graphical user interface. For example, by pointing to an icon in the document of interest and dragging the icon into the knowledge base browser/editor, the system will store an information source description object in the knowledge base. The system will automatically extract certain information source description attributes from the document. The user may specify a particular knowledge base concept that the information source description is to be an instance of by dragging the icon to a particular node in the directed graph. The system also provides means for textually editing the information source description attributes prior to adding the information source description as a knowledge base object.

The knowledge base browser/editor is also used to browse the knowledge base. If a user points to a node in the directed graph, the system displays a list of information source description objects which are stored as instances of the concept related to that node. This list is interactive in that the user may point to one of the displayed objects and the document related to the object will be retrieved and displayed in the hypertext browser. The system also allow for a user to perform more complex queries on the knowledge base by entering a textual query.

The information space browsed by the hypertext browser will typically contain unstructured data sources. These data sources are appropriate for browsing in that there is no defined structure to the information. In accordance with another aspect of the invention, a structured database query may be used to provide a user with information from an unstructured data source. A user makes a request for information to the system as a query. The system responds to the query by retrieving as much information as possible from the structured data sources. This information is then used to prune the set of unstructured data sources to identify a subset of such sources. The hypertext browser then browses this subset of unstructured data sources. In this manner, the user is focused on the unstructured information sources which are most relevant to the request for information.

These and other advantages of the invention will be apparent to those of ordinary skill in the art by reference to the following detailed description and the accompanying drawings.

BRIEF DESCRIPTION OF THE DRAWINGS

FIG. 3 shows the algorithm employed in the preferred embodiment described in the parent of the present application to generate query subplans;

FIG. 4 shows the algorithm employed in the preferred embodiment described in the parent of the present application for dynamically generating a query plan;

FIG. 8 shows a display of the path history browser of a preferred embodiment of the user interface in accordance with the present invention.

DETAILED DESCRIPTION

The following detailed description contains material from the detailed description of the parent of the present application, U.S. patent application Ser. No. 08/347,016, through the section entitled Obtaining Domain and Source Information and including FIGS. 1–5. The new material which is being added in the present application begins at the section entitled Improved User Interface and includes FIGS. 6–8.

Architecture
Architecture Overview

Figure 1:
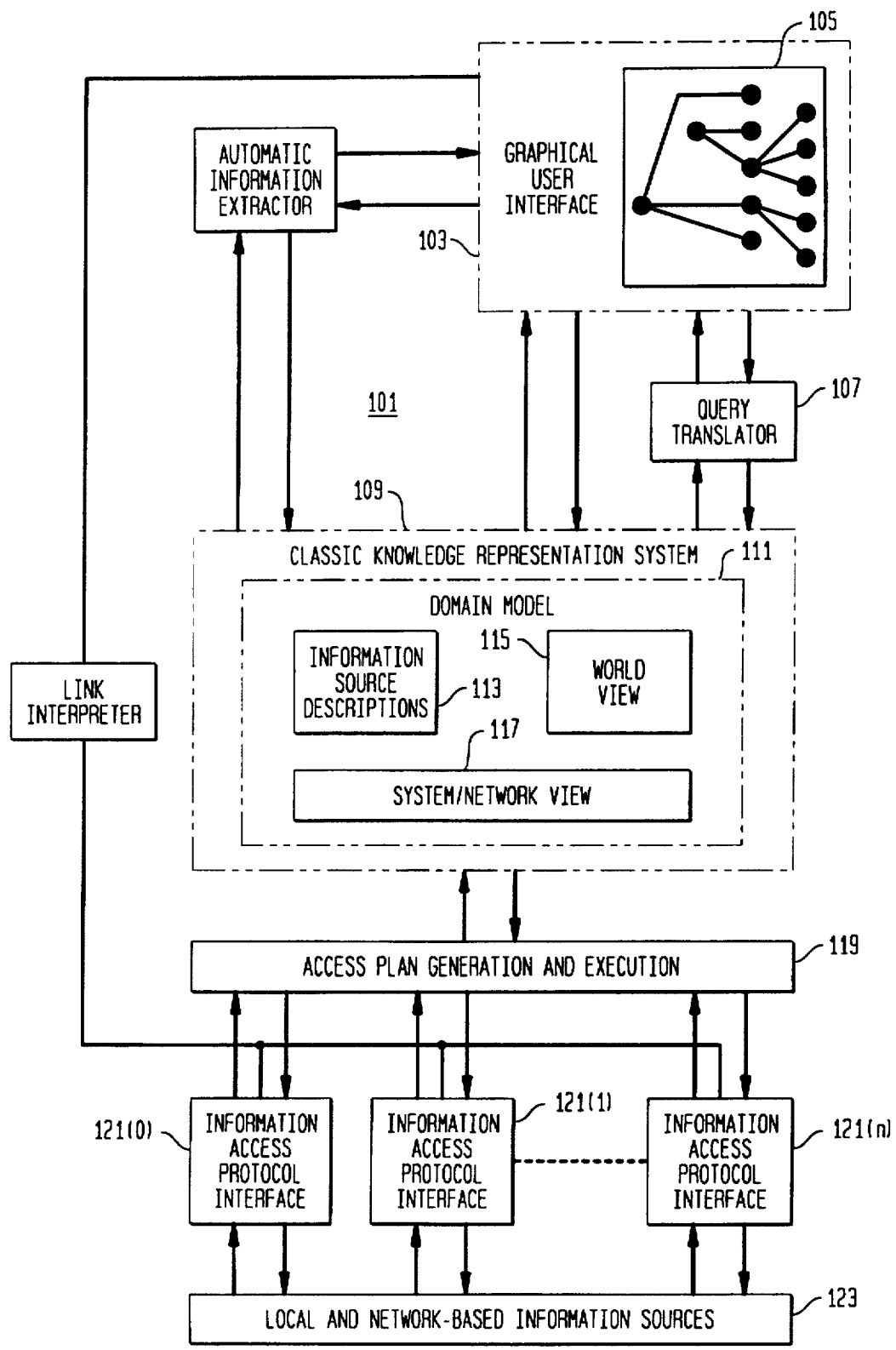
FIG. 1 is a conceptual overview of the information retrieval system described in the parent of the present application.

FIG. 1 presents an overview of an information retrieval apparatus 101 which incorporates the principles of the invention. A preferred embodiment of information retrieval apparatus is implemented using a digital computer system and information sources which are accessible via the Internet communications network.

The central component of apparatus 101 is a knowledge base 109 built upon a description logic based knowledge representation system (CLASSIC in the preferred embodiment) which is capable of performing inferences of classification, subsumption, and completion. Knowledge-base systems are described generally in Jeffery D. Ullman, *Principles of Database and Knowledge-base Systems*, Vols. I–II, Computer Science Press, Rockville, Md., 1989. Descriptions of CLASSIC may be found in Alex Borgida, Ronald Brachman, Deborah McGuinness, and Lori Resnick, "CLASSIC: A Structural Data Model for Objects", in *Proceedings of the 1989 ACM SIGMOD International Conference on Management of Data*, pp. 59–67, 1989, R. J. Brachman, et al., "Living with CLASSIC", in: J. Sowa, ed., *Principles of Semantic Networks: Explorations in the Representations of Knowledge*, Morgan-Kaufmann, 1991, pp. 401–456, and L. A. Resnick, et al., *CLASSIC: The CLASSIC User's Manual*, AT&T Bell Laboratories Technical Report, 1991.

Knowledge base 109 is used to construct a domain model 111 which organizes information accessible via apparatus 101 into a set of concepts which fit the manner in which the user of system 101 is intending to view and use the information. In system 101, domain model 111 has three components: world view 115, which contains concepts corresponding to the way in which a user of the system looks at the information being retrieved, system/network view 117, which contains concepts corresponding to the way in which the information is described in the context of the data bases which contain it and the communications protocols through which it is accessed, and information source descriptions 113, which contains concepts describing the information sources at a conceptual level. System/network view 117 and information source descriptions 113 are normally not visible to the user. The concepts in these portions of domain model 111 do, however, participate fully in the reasoning processes that determine how to satisfy a query.

An important benefit of using a description logic system like CLASSIC is that as new information is added to the system, much of the work of organizing the new information with respect to the concepts already in knowledge base 109 is done automatically. Only a description of the known attributes of the information must be specified; CLASSIC's inference mechanisms then automatically classify these descriptions into appropriate places in the concept hierarchy.

User interaction with the system is accomplished through browsing and querying operations in terms of high-level concepts (concepts that are meaningful to a user unsophisticated in the details for information location and access). These concepts are intended to reflect the terms in which the user thinks about the type and content of information being queried. By working with these high-level concepts, the user is unburdened with the details of the location and distribution of information across multiple remote information servers.

Information sources 123 are generally (though not limited to) network-based information servers that are accessed by standard internet communication protocols. Sources can also include databases, ordinary files and directories, and other knowledge bases.

Query Translator 107

The query language used in system 101 is based on CLASSIC, but has additional constructors that enable the user to express queries more easily. The query is formulated in terms of the concepts and objects that appear in the world view part 115 of the knowledge base. Query translator 107 translates queries expressed in the query language into CLASSIC description language expressions which are used to consult the knowledge base. Due to the limited expressive power of the description language and the need for special purpose query operators, the query language may contain elements not expressible in the description language of knowledge representation system 109. After partial translation to a description language expression, the remaining fragments of the query are translated to procedural code that is executed as part of the query evaluation.

Knowledge Representation System 109

The knowledge base is a virtual information store in the sense that the information artifacts themselves remain external to the knowledge base; the system instead stores detailed information (in terms of domain model 111) about the location of these information artifacts and how to retrieve them. Retrieval of a particular piece of information is done on demand, when it is needed to satisfy part of a query. The types of information managed in this manner include files, directories, indexes, databases, etc.

The domain model embodied in the knowledge base is logically decomposed into world view 115, system/network view 117, and information source descriptions 113 World view 115 is the set of concepts with which the user interacts and queries are expressed. System/network view 117 concerns low level details which, though essential for generating successful query results, are normally of no interest to the user. Information source descriptions 113 is a collection of concepts for describing information sources. These information source descriptions are expressed in terms of both world and system concepts. The purpose of encoding information source descriptions 113 in the domain model is to make it possible for CLASSIC to reason about what information sources must be consulted in order to satisfy a query.

We define system concepts comprising system/network view 117 as those concepts that describe the low-level details of information access. This includes concepts related to network communication protocols, location addressing, storage formats, index types, network topology and connectivity, etc. Since the knowledge base generally merely retrieves information instead of storing previously-retrieved information, system/network view 117 includes all those concepts relevant to determining attributes like location, retrieval methods, and content format.

Continuing in more detail, concepts within world view 115 describe things with which the user is familiar; they are the concepts that describe characteristics of information artifacts of interest to users. Concepts within information source descriptions 113 relate the concepts in world view 115 to concepts concerning the semantic content of information sources. Thus, given a query which employs concepts in world view 115, knowledge representation system 109 can employ the concepts in information source descriptions 113 to relate the concepts used in the query to actual information sources and can employ system/network view 117 to relate the concepts used in the query to an access plan which describes how to retrieve information from the sources as required to answer the query.

Access Plan Generation and Execution

When a user wishes to obtain information, the user inputs a query in system 101's query language at graphical user interface 103. System 101 then answers the query. There are several steps involved. First, query translator 107 translates the query into a form to which knowledge representation system 109 can respond. Then the translated query is analyzed in knowledge base system 109 to decide which of the external information sources are relevant to the query, and which subqueries need to be sent to each information source. This step uses world view 115 and system/network view 117. The information in system/network view 117 is expressed in a site description language which will be described in more detail later.

Knowledge base 109 uses the conceptual information from world view 115 and system/network view 117 to produce an information access description describing how to access the information required for the query in information sources 123. Knowledge base 109 provides the information access description to access plan generation and execution component 119, which formulates an access plan including the actual commands needed to retrieve the information from sources 123.

1. Plan formulation: Given the information access description, planner 119 decides on the order in which to access sources 123 and how the partial answers will be combined in order to answer the user's query. The key distinction between this step and traditional database techniques is that planner 119 can change the plan after partial answers are obtained. Replanning may of course involve inferences based on concepts from information source descriptions 113 and/or system/network view 117 and the results of the search thus far.

2. Plan materialization: The previous step produced a plan at the level of logical source accesses. This step takes these logical accesses and translates them to specific network commands. This phase has two aspects:

Format translation: the description of the sites is given at a logical level. However, to actually access the site, one must conform to a syntax of a specific query language. In this step, these translations are done.

Specific network commands are generated to access the sites. Here, information from the system/network view is taken into account. Depending on the site being accessed, the system will generate the appropriate commands for performing the access.

The translations to service and site-specific access commands are performed by Information Access Protocol Modules 121 (0..n), described in the following section.

Several points should be noted about the above process:

In executing the plan, system 101 uses a work space in the computer system upon which system 101 is implemented to store its intermediate results.

After executing part of the plan, system 101 may decide to replan for the rest of the query.

Information Access Protocol Modules 121

Access to information sources is done using a variety of standard information access protocols. The purpose of these modules is to translate generic information access operations (retrieval, listing collections, searching indexes) into corresponding operations of the form expected by the information source. For many standard Internet access protocols, the translation is straightforward.

Examples of access protocols supported by these modules include several network protocols defined by Internet RFC draft standard documents, including FTP (File Transfer Protocol), Gopher, NNTP (Network News Transfer Protocol), HTTP (Hypertext Transfer Protocol). In addition, other modules support access to local (as opposed to network-based) information repositories, such as local filesystems and databases.

Site Description Language

As previously pointed out, the concepts in information source descriptions 113 relate concepts in world view 115 to information sources 123. These relationships are expressed using a site description language. CLASSIC and related knowledge representation systems employ description languages which can function as site description languages, but such site description languages do not permit efficient reasoning. In a preferred embodiment, efficiency has been substantially increased by the use of a site description language which extends CLASSIC.

The following discussion of the site description language employed in the preferred embodiment employs the example below:

Consider an application in which we can obtain information about airline flights from various travel agents. We have access to fares given by specific travel agents and to telephone directory information to obtain their phone numbers. In practice, the information about price quotes and telephone listings may be distributed across different external database servers which contain different portions of the information. For example, some travel agent may deal only with domestic travel, another may deal with certain airlines. Some travel brokers deal only with last minute reservations, e.g., flights originating in the next one week. Similarly, directory information may be distributed by area code. In some area codes, all listings may be in one database, while others may partition residential and business customers.

The starting point for the site description language is the description language used in CLASSIC. A description language consists of three types of entities: concepts (representing unary relations), roles (binary relations) and individuals (object constants). Concepts can be defined in terms of descriptions that specify the properties that individuals must satisfy to belong to the concept. Binary relationships between objects are referred to as roles and are used to construct complex descriptions for defining concepts. Description logics vary by the type of constructors available in the language used to construct descriptions. Description logics are very convenient for representing and reasoning in domains with rich hierarchical structure. Description languages other than the one uses in CLASSIC exist and may be used as starting points for site description languages. The only requirement is that the question of subsumption (i.e., does a description $D_1$ always contain a description $D_2$) be decidable. We denote the concepts in our representation language by $D=D_1, \ldots, D_l$.

In our example, we can have a hierarchy of concepts describing various types of telephone customers. The concept customer is a primitive concept that includes all customers and specifically the disjoint subconcepts Business and Residential. Each instance of a business customer has a role BusinessType, specifying the types of business it performs. Given these primitive concepts, we can define a concept TravelAgent by the description.

(AND Business (fills BusinessType "Travel")).

One limitation of description languages is that they do not naturally model general n-ary relations (A relation may be thought of as a a table with columns and rows. An n-ary relation has n columns.) n-ary relations arise very commonly in practice and dealing with such relations is essential to modeling external information sources that contain arbitrary relational databases. Hence our representation language augments description languages with a set of general n-ary relations $\epsilon=E_1, \ldots, E_n$. It should be emphasized that the general n-ary relations are not part of the description language. Hereafter, we refer to the set of relations $\epsilon \cup D$ as the knowledge base relations, to distinguish them from relations stored outside knowledge representation system 109. Our application domain is naturally conceptualized by the following two relations:

Quote(ag, al, src, dest, c, d), denotes that a travel agent ag quoted a price of c to travel from src to dest on airline al on date d.

Dir(cust, ac, telNo), gives the directory listing of customer cust as area code ac and phone number telNo.

A key aspect of our representation language is the ability to capture rich semantic structure using constraints, with which CLASSIC can reason efficiently. An atomic constraint is an atom either of the form $D(x)$, where D is some concept in D, and x is a variable, or $(x_i \theta x_j)$ (or $(x_i \theta a)$) where $x_i$ and $x_j$ are variables, a is a constant and $\theta \in \{>, \geq, <, \leq, =, \neq\}$. Arbitrary constraints are formed from atomic constraints using logical operators $\wedge$ and $\vee$. CLASSIC can determine efficiently whether one class subsumes another using subsumption reasoning in the description logic. Other well-known techniques are used for implication reasoning of order constraints. For details, see the Ullman reference cited above. Any atomic constraint may be used about which implication/subsumption reasoning can be done efficiently. Constraints play a major role in information gathering and are used in several ways. First, semantic knowledge about the general n-ary relations $\epsilon$ can be expressed by constraints over the arguments of the relations. In our example, we can specify that the first argument of the relation Quote must be an instance of the concept TravelAgent. Second, as we discuss in subsequent sections, constraints can be used to specify subsets of information that exist at external sites. For example, a travel agent may have only flights whose cost is less than $1000. Finally, as we see below, constraints are extremely useful in specifying complex queries.

Constraints may be used together with concepts and knowledge base relations to describe properties of extensions of the knowledge base relations, that is, information specified by the knowledge base relations and the properties. The information in the extension may come from the knowledge base, but most often it will come from one or more of the information sources 123. We assume that the definitions of the concepts exist in the knowledge base, although the extensions of the concepts and the relations may not be entirely present in the knowledge base. However, we assume that constraints contain only concepts whose extensions exists in the knowledge base.

Given a query (defined formally below), the knowledge base system must infer the missing portions of the extensions of relations needed to answer the query, using the information present at the external sites. For the purpose of our discussion, the knowledge base can also be viewed as an information source containing part of the extensions.

It should be realized that the problem of finding relevant sites is a crucial problem for system 101. Economical solutions to the problem are important not only for answering queries, but also for other operations. Examples include Processing updates on the knowledge base requires updating relevant site relations and hence, determining the relevant sites.

Efficiently monitoring queries over time requires determining precisely which external site relations should be monitored.

Maintaining consistency among site relations again requires that we determine which sites contain information relevant to a given consistency condition.

Finding the relevant sites is done by extending the algorithm described in Alon Y. Levy and Yehoshua Sagiv, "Constraints and Redundancy in Datalog", Proceedings of the Eleventh ACM SIGACT-SIGMOD-SIGART Symposium on Principles of Database Systems, San Diego, Calif., 1992. The key observation that enables us to use that algorithm is that the language for expressing constraints (concept descriptions and order constraints) satisfies the requirements of the query-tree algorithm outlined in that paper. Finding minimal portions of the sites is done in two steps. The first step determines which portions of the knowledge base relations are needed to solve the query, and the second step determines which portions of the site relations are needed to compute the relevant portions of the knowledge base relations. The algorithm uses the query-tree, which is a tool that, given a query which is expressed in terms of certain relations will specify which portions of the mentioned relations are relevant to the query. The first step is done by building a query-tree for the user query, in terms of the knowledge base relations, and pushing the constraints from the query to the KB relations. The second step is done by building a query-tree for each relevant KB relation (which is defined in terms of the external sites), and pushing the constraints to the external site relations.

EXAMPLE 5.1

There are currently many systems providing access to large collections of databases. Consider such a system, which provides access to two kinds of databases: (1) the flight information and price quote databases of various airlines and travel agents in the U.S., and (2) the telephone directory databases of various telephone companies in the U.S., to obtain the phone numbers of the various travel agents.

These different databases often contain the same information redundantly. For example, the United Airlines database contains information about United flights and price quotes, while the database of some travel agent may have flight and price quote information about domestic flights in the U.S. Similarly, the telephone directory information may exist in databases distributed by area code, or in databases distributed by types of customers (e.g., travel agents).

A user accessing this collection of databases may be interested in obtaining a variety of information, e.g., the cheapest flight offered by any airline or travel agent, the phone number of travel agents who offer the cheapest deals, etc. A key problem facing the user of such a current day system is that to find information of interest, the user needs to search the various databases one by one, which is extremely time-consuming and expensive. This problem is exacerbated by the fact that the price quote databases, for example, provided by different travel agents may use different schemas, and different conventions for representing their information.

World-View 115

World-view 115 in the preferred embodiment consists of the following types of entities:

General n-ary relations: The attribute values of these relations are drawn from a rich set of types, which includes primitive types such as integers and strings, as well as more complex types defined by CLASSIC concepts (described below). We refer to these relations by $\epsilon$.

Concepts and objects: The data model of the world-view includes CLASSIC concepts and objects. In CLASSIC, concepts (which correspond to classes in object-oriented databases) are defined in terms of descriptions that specify the properties that objects must satisfy in order to belong to the concept. A collection of CLASSIC concepts can be viewed as a rich type hierarchy.

A concept can itself be viewed as a unary relation; the extension of this relation is the collection of all objects that satisfy the concept description. We denote the concepts in world-view 115 by D. The set of relations $W = D \cup \epsilon$ are collectively referred to as the world-view relations, and are type-set in this font.

Constraints: An important part of the data model of the world-view is the ability to express rich semantic information about the world-view relations using constraints, such as order constraints (e.g., AC=212, Cost<1000). Note that concepts can also be used to express semantic constraints.

Having general n-ary relations in the world-view is essential for modeling sites that contain arbitrary relational databases. (This feature is not present in the world-view of the SIMS system, for example.) For details on SIMS, see Y. Arens, C. Y. Chee, C. nan Hsu, and C. A. Knoblock, "Retrieving and integrating data from multiple information sources", *International Journal on Intelligent and Cooperative Information Systems*, 1994. However, a well-known problem with the relational data model is that it does not provide a rich type structure for values that occur in argument positions of relations. Allowing for values to be drawn from a rich set of types would considerably increase the modeling capabilities of the relational data model. This is achieved in our world-view by augmenting the relational model with CLASSIC's object-oriented model.

Note that our world-view does not explicitly include object attributes. The reason is that an attribute A of a concept C can be viewed as a binary relation, where the first argument of the relation is of type C and the second argument of the relation has the type of attribute A as its type. This is just a special case of general n-ary relations, which are included in our world-view.

Constraints play a central role in the world-view for expressing semantic information. We show how this semantic information is used for efficiently answering queries further on. In principle, our world-view allows constraints to be expressed using any domain where implication (i.e., subsumption) reasoning can be done efficiently. For order constraints, implication reasoning can be done in polynomial-time (see Ullman, supra). Subsumption reasoning in CLASSIC can also be done in polynomial-time (see A. Borgida and P. F. Patel-Schneider, "A semantics and complete algorithm for subsumption in the CLASSIC description logic".*Journal of Artificial Intelligence Research*, 1:277–308, June 1994.)

EXAMPLE 5.2

Consider the airline flight application of Example 5.1. Worldview 115 in this case is naturally conceptualized by the following relations:

quote(Ag,Al,Src,Dst,C,D), denotes that a travel agent Ag quotes a price of C to travel from Src to Dst on airline Al on date D.

dir( Cust,Ac, TelNo), gives the directory listing of customer Cust as area code Ac and phone number TelNo.

areaCode(Pl,Ac) gives the area code(s) associated with place Pl.

The world-view also has a rich type hierarchy of CLASSIC concepts describing, e.g., various types of telephone customers. The concept customer is a primitive type that includes all telephone customers and specifically the disjoint subconcepts business and residential.

Constraints are used to specify types of the attributes of the world-view relations. For example, the attribute Cust of relation dir is constrained to be of type customer, the attribute Ag of relation quote is constrained to be of type travelAgent (a subconcept of business) and the attribute C of quote is constrained to have nonnegative values. □

Using CLASSIC in the World-View

CLASSIC is a member of a family of description logic systems. There are several advantages to using a description logic system as part of the domain model component of a global information system. The key advantage is their ability to support extensibility and modifiability of domain model 111. Although the world-view portion of domain model 111 should be relatively stable, the dynamic nature of the information sources will unavoidably lead to changes in the information descriptions 113 and system/network view 117 portions of domain model 111. (e.g., new specialized services often get created, transient discussion topics arise frequently, etc.). Even with world view 115, users may want to make a personal version of world view 115 by defining new concepts and relations, creating new objects, and asserting constraints about the world-view relations (e.g., a user may want to define the set of universities with a researcher working on global information systems).

A system such as CLASSIC supports extensibility by allowing new concepts to be created and automatically placed in the concept hierarchy. For example, suppose the concept hierarchy included the concepts business and airline_agent (defined as a subconcept of business that has fillers "travel" and "airline" for attribute business_type). If the user wanted to add a new concept trave_agent (defined as a subconcept of business that has a filler "travel" for attribute business_type), CLASSIC would automatically place this new concept in the concept hierarchy between business and airline_agent. This would not be possible in object-oriented database systems that require the class hierarchy to be explicitly created by the user.

A second advantage is that description logic systems do not require the user to explicitly specify all concepts to which an object belongs. Instead, such systems automatically classify objects in the appropriate concepts, based on the definitions of the concepts and the information available about the object. For example, suppose the concept hierarchy included the concepts www_site and ftp_site (which is defined to be the subconcept of www_site whose URL attribute begins with the string ftp:). If the user creates an object as an instance of www_site with its URL as ftp://research.att.com, then the system will also classify it as an instance of ftp_site; this classification is needed to use the appropriate protocol when accessing the site. Current day object-oriented database systems do not allow such automatic classification of objects.

Description logic systems provide varying degrees of expressivity in their concept definition language. Consequently, they vary considerably in the complexity of subsumption reasoning (i.e., does concept $C_1$ subsume concept $C_2$). CLASSIC stands out in this family as a language which has been carefully designed so that subsumption reasoning is in polynomial-time, while still being expressive, and has been used in large-scale commercial applications.

Finally, the most significant limitation of description logic systems is that their scale-up suffers in the presence of large collections of objects. However, this limitation does not impact on the use of CLASSIC in our world-view, since the world-view relations are not explicitly stored; information is explicitly stored only in the external information sources.

The Query Language

Many languages have been proposed for querying object/relational databases Our world-view is also object/relational in nature, synthesizing the relational model with an object-oriented model. Hence, any query language proposed for object/relational databases can be used to query our world-view.

In this paper, for simplicity of exposition, we consider only conjunctive queries of the form:

$$Q(\overline{X}) := C(\overline{Y}), E_1(\overline{X}_1), \ldots, E_k(\overline{X}_k).$$

□

The $E_j$'s are relation names from the world-view relations W, C is a constraint on the variables of the query, and $\overline{X}$, $\overline{Y}$, $\overline{X}_1, \ldots, \overline{X}_k$ are constants, variables, or world-view objects. Constraints in queries are conjunction of order-constraints.

EXAMPLE 5.3

The following query retrieves the names and phone numbers of travel agents in Miami who sell tickets from Newark to Santiago on any airline for under $1000:

query(Name,AC,TelNo) :- quote(Ag,Al, 'Newark, NJ', 'Santiago, Chile', C,D), areaCode('Miami, FL',AC), dir(Ag,AC,TelNo), name(Ag,Name),C<1000.

This query does not explicitly make use of the world-view concept travelAgent, since the type of Ag in the world-view relation quote is constrained to be the concept travelAgent.

□

Typically, languages for querying object/relational databases use SQL-like constructs to access attributes of relations, and "path expressions" to access attributes of objects. In our world-view, concepts can be viewed as unary relations, and object attributes can be viewed as binary relations. Consequently, accessing object attributes using path expressions is equivalent to using a chain of unary and binary relations corresponding to concepts and attributes. For this reason, our queries are conjunctive relational queries expressed in terms of the world-view relations and objects.

Figure 2:
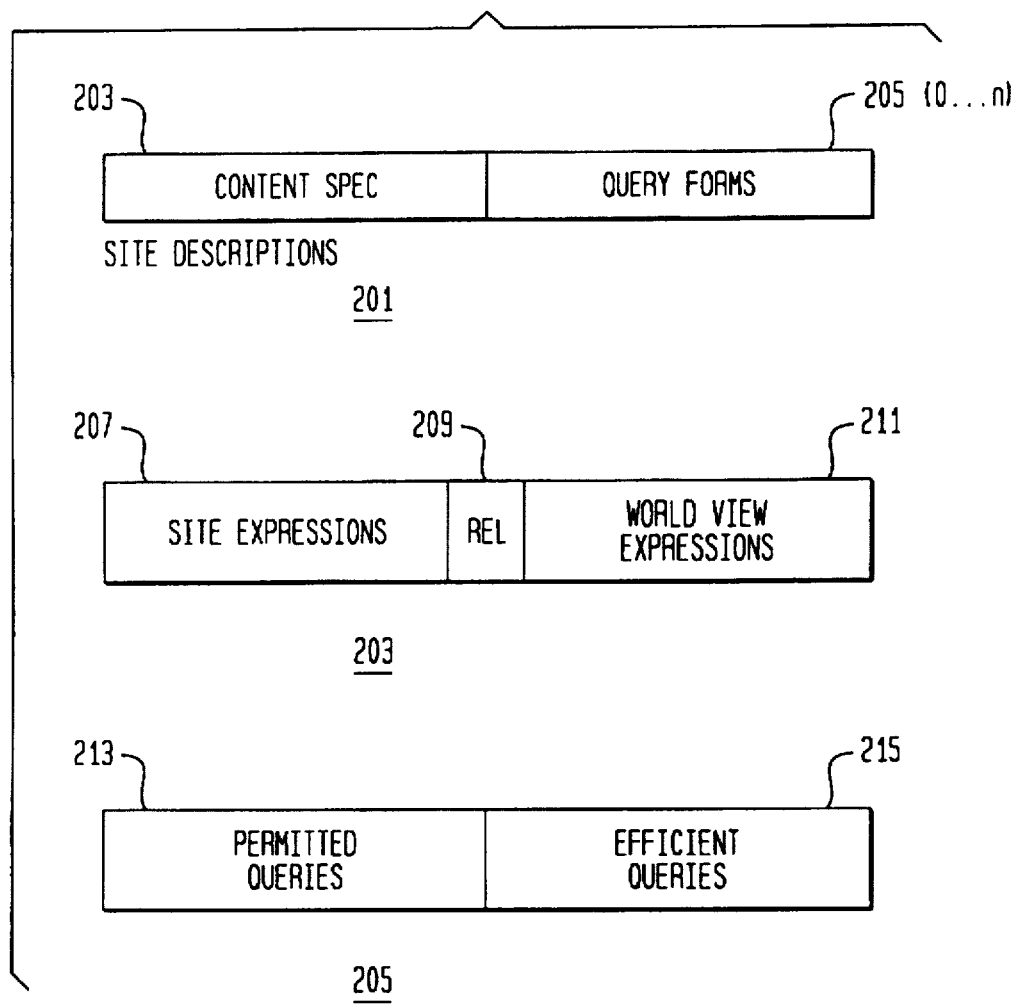
FIG. 2 is a detail of a site description in a preferred embodiment described in the parent of the present application.

Sites and Site Descriptions: FIG. 2

Users pose queries in terms of the relations W of world view 115. However, the world-view relations constitute just a conceptual view; the information required to answer queries is present in the external information sources 123 described in information source descriptions 113. Information sources 123 can be viewed as providing extensions of site relations R from information source descriptions 113, which are type-set in this font. In order to answer user queries, the system needs a precise description of the site relations R. Such a description is termed herein a site description. As shown in FIG. 2, a site description 201 in a preferred embodiment includes at least two types of information:

- a content specification 203 which relates the contents of the external relations R with the world-view relations W.

- a set of query forms 205 (0..n) which indicates subsets of queries on the relations R that the external site is willing to answer.

In a preferred embodiment, there are two subsets of queries indicated by the query forms: those queries which the external site can answer at all and those queries which the external site can answer efficiently. We first present some examples of site descriptions 201 to illustrate specification of content and capability. We then formally describe the language used for content specifications 203.

EXAMPLE 5.4

A travel information source provides directory information for travel agents in the relation travel_dir(Ag,Ac,TelNo). Content specification 203 for this relation specifies that this relation contains telephone information about travel agents in the dir world-view relation, though not necessarily all travel agents.

The query forms 205 for this travel information source specify that this source answers two kinds of queries: first, the information source provides an agent's area code and phone number, given a specific travel agent, and second, the information source provides all travel agents and their phone numbers, given an area code. This information source does not answer queries where none of the arguments is bound to a constant.

The Manhattan directory information source provides the relation bigapple_dir(Cust, TelNo). The content specification 203 for this relation specifies that this relation contains the phone numbers of customers in the 212 area code. In addition, content specification 203 specifies that it has complete information about the phone numbers of customers in the 212 area code, i.e., there is no phone number in the 212 area code which does not exist in the relation bigapple_ dir. Specifying completeness information is useful for a query processor to determine that it need not query any other sources for information regarding 212 phone numbers. See O. Etzioni, K. Golden, and D. Weld. "Tractable closed world reasoning with updates", In *Proceedings of KR-94*, 1994. □

Details of Content Specifications 203

A content specification 203 describes the contents of external site relations R by relating them to the world-view relations W. A content specification 203 thus has three parts: a right hand 211 which is a conjunction of expressions involving relations in world view 115, a left hand 207 of expressions involving relations in information source descriptions 113, and a connector 209 between them. In the site description language of the preferred embodiment, a content specification may have one of the following four forms:

$$C_R(\overline{Y}), R_1(\overline{X}_1), \ldots, R_k(\overline{X}_k) \subseteq C_E(\overline{X}), E(\overline{X}) \quad (1)$$

$$C_R(\overline{Y}), R_1(\overline{X}_1), \ldots, R_k(\overline{X}_k) = C_E(\overline{X}), E(\overline{X}) \quad (2)$$

$$C_R(\overline{X}), R(\overline{X}) \subseteq C_E(\overline{Y}), E_1(\overline{X}_1), \ldots, E_k(\overline{X}_k) \quad (3)$$

$$C_R(\overline{X}), R(\overline{X}) = C_E(\overline{Y}), E_1(\overline{X}_1), \ldots, E_k(\overline{X}_k) \quad (4)$$

The R's (with or without subscripts) refer to the external site relations, the E's (with or without subscripts) refer to the world-view relations, and the $C_R$'s and $C_E$'s denote constraints (order constraints and CLASSIC concepts). $\overline{X}$ (with or without subscripts) and $\overline{Y}$ denote tuples of variables and/or constants. Each expression must be range-restricted, i.e., $\overline{X} \subset \overline{X}_1 \cup \ldots \cup \overline{X}_k$.

The meaning of an expression is the natural one, given by the following relational algebra expressions (where $\sigma$ denotes selection, $\pi$ denotes projection, and $\bowtie$ denotes join). For example, the meaning of content specifications of form (1) is:

$$\pi_{\overline{X}}(\sigma_{C^R(\overline{Y})}(R_1(\overline{X}_1) \bowtie \ldots \bowtie R_k(\overline{X}_k))) \subseteq \sigma_{C^E(\overline{X})}(E(\overline{X})).$$

The meaning of content specifications of form (4) is:

$$\sigma_{C^E(\overline{X})}(R(\overline{X})) = \pi_{\overline{X}}(\sigma_{C^E(\overline{Y})}(E_1(\overline{X}_1) \bowtie \ldots \bowtie E_k(\overline{X}_k))).$$

Expressions of the type (1) and (2) differ from expressions of the type (3) and (4) in the following way. The first two specify how fragments of world-view relations can be computed from the site relations, i.e., the world-view relation fragments are akin to traditional views on the site relations and external database schemas in multidatabases. See W. Litwin, L. Mark, and N. Roussopoulos. "Interoperability of multiple autonomous databases", *ACM Computing Surveys*, 22(3):267–293, September 1990. In contrast, the latter two define the contents of fragments of the site relations as views on the world-view relations.

An expression of type (1) specifies that part of the fragment is computed using the description. An expression of type (2) specifies that all of the fragment is computed using the description. The relationship between expressions of type (3) and (4) is the same as the relationship between expressions of type (1) and (2).

EXAMPLE 5.5

Consider our airline flight application. Fly-by-Night Airlines provides two site relations 207: fbn__lights(Flt, Src, Dest), which denotes that flight Flt of Fly-by-Night Airlines is from Src to Dest, and fbn__quote(Ag, Flt, C, D), which denotes that a designated travel agent Ag of Fly-by-Night Airlines quotes a price of C to travel by flight Flt on date D. The world-view relation 211 quote can be related to the contents of the site relations fbn__flights and fbn__quote using a content specification 203 of the form (1) as follows:

$$\text{fbn\_flights(Flt, Src, Dest), fbnquote(Ag, Flt, C, D)} \subseteq \text{quote(Ag, 'Fly-by-Night', Src, Dest, C, D)}.$$

This content specification 203 states that tuples in the relation quote can be computed by joining tuples in the relations fbn__flights and fbn__quote.

Suppose that only the designated travel agents of Fly-by-Night Airlines were allowed to offer quotes on Fly-by-Night Airlines. Then, all the information about fare quotes for this airline is present in the relations fbn__flights and fbn__quote. This complete information can be represented using a content specification 203 of the form (2) as follows:

$$\text{fbn\_flights(Flt, Src, Dest), fbn\_quote(Ag, Flt, C, D)} = \text{quote(Ag, 'Fly-by-Night', Src, Dest, C, D)}.$$

EXAMPLE 5.6

Consider the external site relations described in Example 5.4. The external site relation travel__dir contains a listing of travel agents, though not necessarily all of them. This is specified using a content specification of the form (3) as follows:

$$\text{travel\_dir(Ag, Name, Ac, TelNo)} \subseteq \text{dir(Ag, Ac, TelNo), travelAgent(Ag) name(Ag, Name)}.$$

This content specification 203 states that the site relation travel__dir already has a subset of the join of the world-view relations dir and travelAgent. □

Our site description language does not allow content specifications 203 of the form:

$$C_R(\overline{Y}), R_1(\overline{X}_1), \ldots, R_k(\overline{X}_k) \supseteq C_E(\overline{X})$$

$$C_R(\overline{X}), R(\overline{X}) \subseteq C_E(\overline{Y}), E_1(\overline{X}_k), \ldots, E_k(\overline{X}_k)$$

Intuitively, these content specifications are not useful because they only provide information about tuples that are "possibly" in the world-view relations, and not about tuples that are "definitely" in the world-view relations. The following example illustrates this point.

EXAMPLE 5.7

The external site relation contains a listing of the phone numbers of all travel agents as well as all insurance agents. The contents of this site relation can be specified using the content specifications:

$$\text{ta\_ia\_dir(Ag, Ac, TelNo)} \supseteq \text{dir(Ag, Ac, TelNo), travelAgent(Ag)}.$$

$$\text{ta\_ia\_dir(Ag, Ac, TelNo)} \supseteq \text{dir(Ag, Ac, TelNo), insuranceAgent(Ag)}.$$

Without any means of distinguishing which number in this site relation is the phone number of a travel agent, and which is the phone number of an insurance agent, this site relation is not useful in answering queries on the world-view relation travelAgent.

Specifying Query Forms 205

Information sources in global information systems are autonomous and, for reasons such as security or privacy, may decide to answer only a subset of the possible queries on the site relations. In our site description language, each information source can specify the subset of queries it is willing to answer using a set of query forms 205 on the site relations provided by the information source. For details on query forms, see J. D. Ullman, *Principles of Database and Knowledge-base Systems*, Volumes I and II, Computer Science Press, 1989.

Intuitively, a query form 205 $m_R$ on a k-ary relation R is a string of length k, using the alphabet {b,f }. A 'b' in the i'th position indicates that the i'th argument of R must be bound to a constant in a query conforming to $m_R$; an 'f' in the i'th position indicates that the i'th argument of R can either be free or be bound to a constant. An information source is willing to answer a query on a site relation if and only the query bindings match one of its query forms.

EXAMPLE 5.8

Consider the external information sources of Example 5.4. The travel information source specifies the subset of queries on relation travel_dir that it is willing to answer as follows:

possible_queries: travel_dir[b f f, f b f].

The query form 205 b f f indicates that, given a specific travel agent, the information source can provide the agent's area code and phone number. The query form 205 f b f indicates that, given an area code, the information source can provide the travel agents and their phone numbers in that area code. □

Often it is the case that some of the queries that an external information source is willing to answer can be answered efficiently, because of clustering of tuples in the site relations, availability of indices, etc. Answering queries in a global information system can be optimized if this information were available to the query processor. Hence, our site description language also allows external information sources to specify the subset 215 of queries that it can answer efficiently, again using query forms 205.

EXAMPLE 5.9

Consider our airline flight application, and the travel information source which provides the site relation travel_dir. This source is willing to answer queries matching either of the query forms b f f and f b f (see Example 5.8). These query forms thus make up the set of permitted queries 213. However, answering queries matching b f f might be efficient because of the availability of a primary index on the travel agent attribute, while answering queries matching f b f might be quite inefficient because of the absence of any clustering in the site relation travel_dir. The subset 215 of queries that can be efficiently answered by the travel information source can be specified as follows:

efficient_queries: travel_dir[bff].

Of course, the access plan would first attempt to use the efficient queries provided by information source 213 to answer the query, and would specify an inefficient query only if there were no other way to obtain the information.

In other embodiments, site descriptions 201 may include other useful information such as the cost and reliability of accessing tuples of the site relations. Incorporation of these into the site description language requires the development of algorithms that can use this information effectively in query evaluation.

Query Evaluation

Users of a global information system 101 formulate queries in terms of relations in world view 115, without regard to the location and distribution of this information. However, the world-view relations are not explicitly stored; all the data that are needed to answer these queries reside in site relations in external information sources 123. It is the task of the query evaluation system to access these external site relations and answer the user's queries. Since the cost of accessing an information source over the network is significant, the main optimization to be performed is to minimize the number of external information sources 123 that need to be accessed in order to answer the query. In this section, we present several techniques that make effective use of site descriptions to minimize access to external information sources.

Answering Queries: FIG. 3

Answering a query in a database system typically has two phases: generating the plan for answering the query, and executing this plan. In traditional database systems, a query plan specifies the order of computing the joins of the database relations in the query and the techniques used for each of the joins. This requires that each of the database relations mentioned in the query be either stored explicitly, or computed on demand. Since the world-view relations in a global information system are not stored explicitly, the query plan has to compute the tuples in the world-view relations from the tuples in the site relations.

Our algorithm for generating a query plan is shown in FIG. 3. Algorithm 301 operates after a join order for the query has been determined using traditional techniques. Algorithm 301 creates sub-plans for evaluating each of the conjuncts in the query. It does so by determining which external information sources need to be queried in order to obtain tuples of a world-view relation $E(\overline{W})$ that satisfies some constraint $C(\overline{W})$ (which is statically computed from the query). Our algorithm assumes that each external site has the capability of answering any query form. The algorithm can be straightforwardly extended, using the techniques described in K. A. Morris, "An algorithm for ordering subgoals in NAIL!", In *Proceedings of the ACM Symposium on Principles of Database Systems*, pg. 8–88, March 1988, to handle cases when only certain query forms can be answered, or when certain query forms can be handled more efficiently.

Algorithm 301 generates a plan that is guaranteed to be sound, i.e., all answers obtained by executing this plan are indeed answers to the query. If all content specifications are of the forms (1) or (2), executing the plan is also guaranteed to generate all possible answers to the query, i.e., our algorithm is also complete.

However, since algorithm 301 tries to answer each conjunct in the query in isolation, it may not find all answers in the presence of content specifications of the forms as illustrated by the following example.

EXAMPLE 5.10

Consider a query that retrieves names and telephone numbers of travel agents in the 212 (Manhattan, New York) area code.

query(Name, TelNo):- travelAgent(Ag), dir(Ag, 212, TelNo), name(Ag,Name).

Suppose that the site relation nyTA precisely has the names and telephone numbers of all the travel agents in the 212 area code, specified using the following content specification:

nyTA(Name, TelNo):=travelAgent(Ag), dir(Ag, 212, TelNo), name(Ag, Name).

The answer to the query can be computed by using just the tuples in the external site relation nyTA. However, our algorithm would not be able to determine that the site relation nyTA is useful, since it would try to separately compute the tuples in the world-view relations travelAgent, dir and name, and the nyTA site relation does not have the variable Ag, which is present in each of the three world-view relations. □

A complete strategy for answering queries in the presence of content descriptions of the forms (3) and (4) requires solving the problem of answering queries using materialized views. A general solution to this problem which works for a large class of query languages is described in the next section. The work on the general solution resulted in a demonstration that answering queries using materialized views (even when the query and the views are just conjunctive queries) is NP-complete, whereas algorithm 301 presented here is in polynomial time.

A key aspect of algorithm 301 is that it generates a plan that accesses only information sources that can possibly contribute to answering the query, given the static constraints in the query and in the site descriptions. Furthermore, we can extend algorithm 301 to cases in which both the query and the content specifications 203 of the form (1) and (2) involve aggregation, negation and recursion, using techniques described in A. Y. Levy and Y. Sagiv, "Constraints and redundancy in Datalog", In *Proceedings of the Eleventh ACM Symposium on Principles of Database Systems*, San Diego, Calif., June 1992; A. Y. Levy, I. S. Mumick, Y. Sagiv, and O. Shmueli, "Equivalence, query-reachability and satisfiability in Datalog extensions", In *Proceedings of the ACM Symposium on Principles of Database Systems*, Washington, D.C., 1993; and A. Y. Levy, I. S. Mumick, and Y. Sagiv. "Query optimization by predicate move-around", In *Proceedings of the International Conference on Very Large Databases*, Santiago, Chile, September 1994.

Answering Queries using Materialized Views

Answering a query using materialized views can be done in two steps. In the first step, containment mappings from the bodies of the views to the body of the query are considered to obtain rewritings of the query. The appropriate view literals for the rewriting are added to the query. In the second step, redundant literals of the original query are removed. Once this is done, evaluation of the query is done using one of these new versions which is cheaper to evaluate than the original query. The following discussion begins with some preliminary definitions and a running example and then presents detailed descriptions of the two steps.

Preliminaries

In our discussion we refer to the relations used in the query as the database relations. We consider conjunctive and unions of conjunctive queries (i.e., datalog without recursion). In addition, queries may contain built-in comparison predicates (=, ≠, <and ≦). We use $V, V_1, \ldots, V_m$ to denote views that are defined on the database relations. Views are also defined using queries. Given a query Q, our goal is to find an equivalent rewriting Q' of the query that uses one or more of the views:

Definition 5.1: A query Q' is a rewriting of Q that uses the views $V=V_1, \ldots, V_m$ if Q and Q' are equivalent (i.e., produce the same answer for any given database), and Q' contains one or more occurrences of literals of V.

We consider only rewritings that have the same form as the original query (i.e., they do not use a more expressive query language than the original query).

We say that a rewriting Q' is locally minimal if we cannot remove any literals from Q' and still retain equivalence to Q. A rewriting is globally minimal if there is no other rewriting with fewer literals.[1]

[1] Note that we do not count literals of built-in predicates.

EXAMPLE 5.11

Consider the following query and view:

$$q(X,U):- p(X,Y), p_0(Y,Z), p_1(X,W), p_2(W,U).$$

$$v(A,B):- p(A,C), p_0(C,B), p_1(A,D)$$

The query can be rewritten using v as follows:

$$q(X,U):- v(X,Z), p_1(X,W),p_2(W,U).$$

Substituting the view enabled us to remove the first two literals of the query. Note, however, that although the third literal in the query is guaranteed to be satisfied by the view, we could not remove it from the query because the variable W also appears in the last literal. ■ □

Clearly, we would like to find rewritings that are cheaper to evaluate than the original query. The cost of evaluation will depend on many factors which differ from application to application. In this paper we consider rewritings which reduce the number of literals in the query, and in particular, reduce the number of database relation literals in the query. In fact, we will show that any rewriting of Q that contains a minimal number of literals is isomorphic to a query that contains a subset of the literals of Q and a set of view literals. Although we focus on reducing the number of literals, it should be noted that rewritings can yield optimizations even if we do not remove literals from the query, as illustrated by the following example.

EXAMPLE 5.12

Using the same query as in Example 5.11, suppose we have the following view:

$$v_1(A) :- p(A,C),p_1(A,D)$$

We can add the view literal to the query to obtain the following rewritten query.

$$q(X,U):- vv(X),p(X,Y), p_0(Y,Z), p_1(X,W), p_2(W,U).$$

The view literal acts as a filter on the values of X that are considered in the query. It restricts the set of values of X to those that appear both in the relation p and $p_1$. ■ □

In some applications we may not have access to any of the database relations. Therefore, it is important to consider the problem of whether the query can be rewritten using only the views. We call such rewritings complete rewritings:

Definition 5.2: A rewriting Q' of Q, using $V=V_1, \ldots, V_m$ is a complete rewriting if Q' contains only literals of v and built-in predicates. □

EXAMPLE 5.13

Suppose that in addition to the query and the view of Example 5.11 we also have the following view:

$v_2(A,B) :- p_1(A,C), p_2(C,B), p_0(D,E)$.

The following is a complete rewriting of q that uses $v$ and $v_2$:

$q(X,U) :- v(X,Z), v_2(X, U)$.

It is important to note that this rewriting cannot be achieved in a stepwise fashion by first rewriting q using $v$ and then trying to incorporate $v_2$ (or the other way around). Finding the complete rewriting requires that we consider the usages of both views in parallel. ■ □

Finding Redundant Literals in the Rewritten Query

In this section we describe a polynomial algorithm for the second step. Given mappings from the views to the query, the algorithm determines a set of literals from the query that can be removed. We show that under certain conditions there is a unique maximal set of such literals and the algorithm is guaranteed to find them. In other cases, the algorithm may find only a subset of the redundant literals, but all the literals it removes are guaranteed to be redundant, and therefore the algorithm is always applicable. Note that in such cases, the rest of the query can still be minimized using known techniques. Together with an algorithm for enumerating mappings from the views to the query, our algorithm provides a practical method for finding rewritings. For simplicity, we describe the algorithm for the case of rewriting using a single occurrence of a view.

Suppose our query is of the form $q(\overline{X}) :- p_1(\overline{U}_1), \ldots, p_n(\overline{U}_n)$. (5)

and we have the following view:

$v(\overline{Z}) :- r_1(\overline{W}_1), \ldots, r_m(\overline{W}_m)$. (6)

Let h be a containment mapping from the body of v into the body of q, and let the following be the result of adding the view literal to the query:

$q(\overline{X}) :- p_1(\overline{U}_1), \ldots, p_n(\overline{U}_n), v(\overline{Y})$, (7)

where $\overline{Y}=h(\overline{Z})$. Note that we can restrict ourselves to mappings where the variables of $\overline{Y}$ already appear in the $p_i(\overline{U}_i)$. To obtain a minimal rewriting, we want to remove as many of the $p_i$ literals as possible.

To determine the set of redundant literals, consider the rule resulting from substituting the definition of Rule (6) instead of the view literal in Rule (7). That is, we rename the variables of Rule (6) as follows. Each variable T that appears in $\overline{Z}$ is renamed to h(T), and each variable of Rule (6) that does not appear in $\overline{Z}$ is renamed to a new variable (that is not already among the $p_i(\overline{U}_i)$. Let the following be the result of this substitution.

$q(\overline{X}) :- p_1(\overline{U}_1), \ldots, p_n(\overline{U}_n), r_1(\overline{V}_1), \ldots,$ Note that the variables of $\overline{Y}$ are the only ones that may appear in both the $p_i(\overline{U}_i)$ and the $r_j(\overline{V}_j)$.

Given the mapping h, there is a natural containment mapping from Rule (8) into the original rule for q (i.e., Rule (5)) that is defined as follows. Each subgoal $p_i(\overline{U}_i)$ is mapped to itself and each subgoal $r_j(\overline{V}_j)$ is mapped to the same subgoal of Rule (5) as in the containment mapping h (from Rule (6) to Rule (5)). We will denote this containment mapping as $\phi$. The following is an important observation about $\phi$: The containment mapping $\phi$ maps each variable of $\overline{Y}$ to itself.

Each subgoal $p_i(\overline{U}_i)$ of Rule (5) is the image (under $\phi$) of itself, and maybe a few of the $r_j(\overline{V}_j)$ literals. We say that the literals $r_j(\overline{V}_j)$ that map to $p_i(\overline{U}_i)$ under $\phi$ are the associates of $p_i(\overline{U}_i)$. For the rest of the discussion, we choose arbitrarily one of the associates of $p_i(\overline{U}_i)$ and refer to it as the associate of $p_i(\overline{U}_i)$. Note that if h maps each subgoal $r_j(\overline{V}_j)$ to a unique subgoal in Rule (5), then each $p_i(\overline{U}_i)$ will have at most one associate.

Before we define the set of redundant subgoals, we need the following definition:

Definition 5.3: A subgoal $r_j(\overline{V}_j)$ covers a subgoal $p_i(\overline{U}_i)$ if all of the following hold.

The subgoals $r_j(\overline{V}_j)$ and $p_i(\overline{U}_i)$ have the same predicate.

If $p_i(\overline{U}_i)$ has a distinguished variable (or a constant) in some argument position a, then $r_j(\overline{V}_j)$ also has that variable (or constant) in argument position a.

If argument positions $a_1$, and $a_2$ of $p_i(\overline{U}_i)$ are equal, then so are the argument positions $a_1$, and $a_2$ of $r_j(\overline{V}_j)$.

□

The set of redundant literals in Q will be the complement of the needed literals n, defined as follows:

Definition 5.4: The set N is the minimal set satisfying the following four conditions.

1. All the $p_i(\overline{U}_i)$ that do not have associates are in N
2. If $r_j(\overline{V}_j)$ is the associate of $p_i(\overline{U}_i)$ and $r_j(\overline{V}_j)$ does not cover $p_i(\overline{U}_i)$, then $p_i(\overline{U}_i)$ is in N.
3. Suppose that all of the following hold.

Subgoal $p_i(\overline{U}_i)$ has the variable T in argument position $a_1$.

The associate of $p_i(\overline{U}_i)$ has the variable[2] H in argument position $a_1$.

The variable H is not in $\overline{Y}$ (hence, H appears only among the $r_j(\overline{V}_j)$).

The variable T also appears in argument position $a_2$ of $p_1(\overline{U}_1)$.

The associate of $p_i(\overline{U}_i)$ does not have H in argument position $a_2$.

Then $p_i(\overline{U}_i)$ is in N.

[2] Note that the associate of $p_i(\overline{U}_i)$ cannot have a constant in argument position $a_1$ if $p_i$ argument position.

4. Suppose that $p_i(\overline{U}_i)$ is in N and that variable T appears in $p_i(\overline{U}_i)$. If $p_j(\overline{U}_j)$ has variable T in argument position a and its associate does not have T in argument position a, then $p_j(\overline{U}_j)$ is also in N.

EXAMPLE 5.14

Consider the query and the view of Example 5.11. The result of substituting the view in the query would be the following:

$q(X,U) :- p(X,Y), p_0(Y,Z)p_1(X,W), p_2(W,U), p(X,C), p_0(C,Z), p_1(X, D)$.

The literal $p_2(W,U)$ is needed because it does not have an associate. The literal $p_1(X,W)$ is needed by condition 4 in the definition, because its associate $p_1(X,D)$ does not contain the variable W (which appears in $p_2(W,U)$). Consequently, these two literals need to be retained to obtain the minimal rewriting. □

Further details and the proofs of complexity may be found in A. Y. Levy, A. O. Mendelzon, Y. Sagiv, and D. Srivastava. "Answering queries using views", will appear in *Proceedings of 14th Symposium on Principles of Database Systems*, San Jose, Calif., May 22–25, 1995.

Using Completeness Information

In generating a plan for answering a query, algorithm 301 accesses all (and only) sources that may contribute to answering the query. While this may be necessary in general, there are many cases where a small subset of the relevant site relations contains all the information needed to answer the query. Since completeness information of single sources can be expressed in the content specification 203 (using specifications of the forms (2) and (4)), the query processor can effectively use these forms of content specification 203 to ignore redundant sites.

EXAMPLE 5.15

Consider the airline flight application. Let the site relation ta__dir contain listings of all travel agents in the U.S. and let the site relation bigapple__dir contain listings of all telephone customers in the 212 area code.

Accessing both these site relations is redundant in order to answer a query that asks for the phone number of a specific travel agent in the 212 area code, although both these site relations are relevant to answering this query. Querying either of these two site relations suffices.

Both these site relations are also relevant to answer the query that asks for the phone number of a specific travel agent (without knowing the area code of the travel agent). However, querying ta__dir is sufficient in this case, though querying bigapple__dir may not be sufficient. □

Intuitively, we use content specifications of the form (2) as follows. Given that we are trying to compute tuples of a world-view relation E that satisfy the constraint C, we search for a minimal set $SD_1, \ldots, SD_n$ of content specifications 205 which together can be used to compute all the tuples of E that satisfy C. Formally, the algorithm for doing this is the following.

Suppose we are trying to compute the tuples of $E(\overline{W})$ that satisfy the constraint $C(\overline{W})$. Our algorithm chooses a set $SD_E = (SD_1, \ldots, SD_n)$ of content specifications of the form (2):

$$C_E^j(\overline{Y}^j), R_1^j(\overline{X}_1), \ldots, R_k^j(\overline{X}_k) \Rightarrow C_E^j(\overline{W}), E(\overline{W})$$

for $1 \leq j \leq n$ such that:

$C(\overline{W}) \Rightarrow C_E^1(\overline{W}) \vee \ldots \vee C_E^n(\overline{W})$.

There is no subset of $SD_E$ that satisfies the first property. If such a set does not exist for $C(\overline{W})$, then let $C'(\overline{W})$ be the weakest constraint for which such a set does exist. (The constraint $C'(\overline{W})$ can be obtained by conjoining $C(\overline{W})$ with the disjunction of the $C_E$'s of all content descriptions of the form (2).) The tuples of $E(\overline{W})$ that satisfy the constraint $C''(\overline{W})$ can be computed using content specifications 205 of the form (2), as above. Furthermore, let $C''(\overline{W})$ be $C(\overline{W})\backslash C'(\overline{W})$. The tuples of $E(\overline{W})$ that satisfy the constraint $C''$ can be computed using the other content specifications 205, as described in Algorithm 301.

Although the above algorithm is not a polynomial time algorithm (even for order constraints), the complexity of the algorithm is in the size of the representation of the query constraints and the site description constraints, not in the size or number of the site relations.

Dynamic Query Plans

In traditional database systems, the plan execution comes strictly after the query is optimized and the complete plan for evaluating the query is generated. Although such a static query plan is adequate for traditional database system applications, global information systems require dynamic plans, where the query plan generation phase interacts with the plan execution phase. The following example illustrates the benefits of postponing generating plans for sub-queries until run-time, when values are known for some of the query variables.

EXAMPLE 5.16

Consider the airline flight application. The following query retrieves the telephone numbers of travel agents in Manhattan, New York:

query(AC, TelNo): - areaCode('Manhattan, NY', AC), travelAgent(Ag), dir(Ag, AC, TelNo).

The constraint travelAgent(Ag) present statically in the query entails that directory information sources that do not contain listings of travel agents are irrelevant to answering the query. However, in the absence of knowledge about tuples in the world-view relation areaCode (which are computed only at run-time), the query plan would have to treat all other directory information sources (e.g., the one for the 908 area code) as relevant to the query.

However, once the sub-query areaCode('Manhattan, NY', AC) is evaluated, the bindings for AC (in this case just 212) can be used to restrict the set of relevant directory information sources to only those with area code 212. □

To be able to perform such optimizations, it is necessary that we pass sideways values computed for some of the query variables to create or modify segments of the query plan dynamically, i.e., at run-time. The following example illustrates the optimization benefits of passing not just values of the query variables, but also additional information obtained at run-time.

EXAMPLE 5.17

Suppose that unitedAgent and americanAgent were disjoint subconcepts of the concept travelAgent, i.e., no travel agent is both an agent for United Airlines and for American Airlines. Assume that the United Airlines information source provides a directory service for United Airlines agents ua__dir(Ag, AC, TelNo), and American Airlines provides a directory service for American Airlines agents aa__dir(Ag, AC, TelNo). The content specifications 205 for these site relations are as follows:

ua__agents(Ag, AC, TelNo)⊂unitedAgent(Ag),dir(Ag, AC, TelNo).

aa__dir(Ag, AC, TelNo)⊂americanAgent(Ag),dir(Ag, AC, TelNo).

Consider now the following query that retrieves the telephone numbers of award-winning travel agents (a subconcept of travelAgent).

query(AC,TelNo):- awardTravelAgent(Ag),dir(Ag, AC, TelNo).

If a binding for awardTravelAgent(Ag) was found at a site that only had information about United Airlines agents, this information could be used to determine that the site relation aa_dir is irrelevant for answering the query, therefore showing that knowing the source from where the binding for Ag was found can be used to prune the directory sources where no matching listing would be found. □

The above examples illustrate the two key features of dynamic query plan generation:

1. Postpone planning for sub-queries until run-time, when sufficient information is available to determine a small set of relevant sources.
2. Pass additional information obtained at run-time, not just values of query variables, to the query optimizer.

We have identified two additional pieces of information that are very useful for pruning information sources, and which can be easily determined from the site descriptions, and passed in the binding information for query variables: (1) the type of the value, and (2) the location where the value was found. Details concerning the information and how to use it in an algorithm for dynamically generating a query are presented below.

A second reason for supporting dynamic query plans in a global information system is that when the external information sources are distributed over a computer network, it is quite likely some external sources are unavailable when required. In the presence of alternative information sources that can provide the same information (because of redundancy in the autonomous information sources), the query plan must be dynamically modifiable.

Types of Information which are Useful in Dynamic Query Generation

The following discussion provides details about the selection of information which is useful in dynamic query generation. The discussion is based on Craig A. Knoblock and Alon Levy, "Efficient Query Processing for Information Gathering Agents", to appear in working notes of the 1995 AAAI Spring Symposium on Information Gathering in Distributed and Heterogeneous Environments, available from AAAI. In the following, C, $C_i$ etc. denote classes in domain model 111. Binary relations among objects in domain model 111 are represented by roles (denoted by $r, r_i$ etc.). The discussion also employs a running example in which system 101 has received a query concerning the publications of Ron Brachman, who is a researcher in artificial intelligence at AT&T Bell Laboratories.

An information source 123 s can be viewed as providing some knowledge about a class in the domain model $C_s$. It can either provide some or all of the instances of the class $C_s$. In the latter case we will say that s is a complete source. The source s also provides some role fillers for the instances it knows about. Formally, s provides the role fillers for the roles $r_1^s, \ldots, r_n^s$. For each role, s may provide all the fillers or only some of them. The information about which class and roles s knows about it is contained in information source description 113 for s.

We can now describe the kinds of information that can be obtained by system 101 at run time and how they can be used. The first set of information types (called domain information) include information about the class hierarchy and individuals in those classes. Specifically, we have identified the following types of information:

Membership An individual being a member (or not a member of a class), for example, Ron Brachman being an instance of AI-researcher.

Fillers One or more individuals filling a role of another individual (or not being a filler of a role), for example, that the affiliation of Ron Brachman is AT&T Bell Labs.

Size The size of a class or the number of fillers of a role.

Constraints High level constraints on classes or fillers of roles (e.g., all fillers are in a certain range).

Relationships Relationships between different classes or roles (e.g., one class contains another).[3]

[3] Note that intensional subsumption relationships between classes are can be inferred in the domain model. This class of information refers to extensional containment relationships, e.g., in the current state, all instances of $C_1$ are also instances $C_2$.

The second set of information types (called source information) are like the above types, but concerns knowledge about information sources, and not about the domain model's class hierarchy:

Membership An individual being found in an information sources (or not being found there).

Fillers One or more individuals filling a role of another individual in a specific information source.

Size The number of class instances found in a specific information sources.

Constraints High level constraints specific to an information source (e.g., an information source only contains Bell Labs researchers).

Relationships Relationships between different classes or roles (e.g., source $s_1$ containing all the data in source $s_2$).

It should be noted that in some cases the domain information can be inferred from the source information, and the description of the sources.

Using the Information to Optimize Queries

There are several ways in which the information types outlined above can be used to optimize queries:

Membership Membership information can be useful in identifying an information source that is likely to contain additional information. If we found the individual a in source s, and a subsequent subgoal asks for the filler of a role r of a, we will first check whether s contains fillers for r (which will be known in the description). Note that this type of information is especially useful because typically information sources will only have part of the instances of a class, and therefore, finding an instance in a given information sources is a significant piece of information.

Fillers Information about specific fillers for roles can be used to constrain the queries to other information sources. For example, if we learn the area code for Bob Jones from one information source, then it can be incorporated into the query sent to another information source.

Size Size information about classes and intermediate results is useful in ordering subgoals in a query. Traditional query processing systems estimate sizes before processing starts, but using actual size information may be critical when good estimates are unavailable.

Relationships The main use of additional domain model information is to rule out possible information sources. Knowing that an individual belongs to a more specific class that can be inferred from the query enables us to limit the number of sources considered in later subgoals of the query that contain the individual as a binding. For example, knowing that Ron Brachman is an AI researcher enables us to focus on paper repositories that provide AI publications. Knowing that he is an AT&T employee provides a justification for considering first a paper repository from AT&T researchers.

Constraints Domain-level constraints can be used by propagating the restrictions from one subgoal to the next. This is similar to some of the reformulations done with semantic query optimization, except that the constraints are identified dynamically instead of using precompiled information.

Completeness Completeness information about a class (or the fillers of a role) enable us to stop searching for more instances of the class (or fillers of that role).

Obtaining Domain and Source Information

A second dimension along which dynamic query processing methods differ is the way that the domain and source information are obtained:

Information can be found by simply solving subgoals in the query. Instead of recording only the values of the bindings that are found in solving a subgoal, we can also record the information sources in which they are found. Additional domain knowledge can be inferred from the description of the information source in which the binding was found. For example, if Ron Brachman was found in the AAAI-fellow information source, then we can infer that he is a member of the class AAAI-fellows, which is a subclass of AI-researcher. If Brachman was not found in an information source that contains all physics researchers, then we can infer that he is not a physicist. Details of this technique are presented below.

Information about a binding can be found in the process of trying to solve the subgoal that needs the information. For example, we may begin considering a few paper repositories to find Brachman's papers, and by doing so figure out that he is a member of AI-researcher class. This will enable us to prune the subsequent paper repositories we consider.

Information gained in solving previous queries can be used. The challenge here is to remember from previous queries only information that may be relevant in future queries, and will not change rapidly.

Finally, an the information agent can create new subqueries in order to actively seek information about bindings. For example, by considering the descriptions of information sources providing paper repositories, the agent can determine that knowing the affiliation and field of an author dramatically reduce the number of relevant information sources. Therefore, the agent may first pose a query looking for Brachman's field and affiliation, before solving the query.

Algorithm for Dynamically Generating a Query Plan FIG. 4

In overview, the algorithm shown in FIG. 4 works by using type information received from information source 123 to prune the sub-plans used to compute the tuples for the rest of the query. In detail, algorithm 401 for dynamically generating a query plan first determines a join order using traditional techniques. Then, algorithm 401 operates in two phases when evaluating each conjunct in the query. In the first phase 405, algorithm 401 uses the known bindings for the query variables to generate a sub-plan for evaluating the conjunct. In the second phase 407, algorithm 401 accesses the relevant information sources and generates new bindings for the query variables using type information received from the relevant information sources. The type information appears in algorithm 401 as $C_R^{SD}$ 409, that is, a constraint on the external site relation. In other embodiments, information other than type binding information may be used.

Algorithm 401 alternates between phase 405 and 407 until each conjunct in the query has been evaluated, and the query answered. Although algorithm 401 chooses a join order at compile-time, it is straightforward to extend the algorithm to use the binding information to decide on a join order dynamically.

It is important to stress that all the type information 409 that algorithm 401 uses for optimizing queries at run-time is available statically in the query and the various site descriptions. In principle, it is possible to generate all possible query plans at compile-time and merely choose from amongst these plans at run-time. Practically speaking, the large number of information sources makes this approach quite infeasible, and our algorithm creates plans for segments of the query at run-time.

Figure 5:
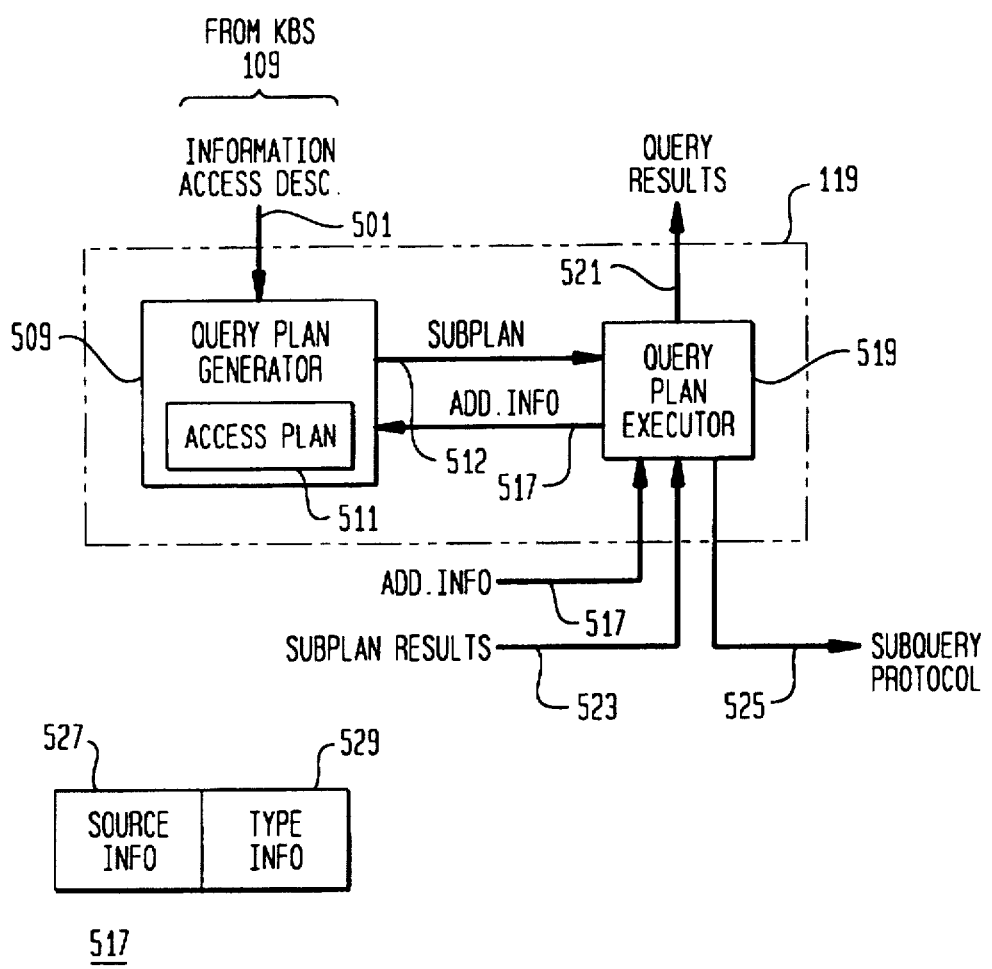
FIG. 5 is a detailed block diagram of access plan generation and execution component 119 of information retrieval system 101 in the preferred embodiment described in the parent of the present application.

Access Plan Generation and Execution 119 in a Preferred Embodiment: FIG. 5

In order to implement algorithm 401, access plan generation and execution component 119 of system 101 must be modified as shown in FIG. 5. Component 119 has two subcomponents: query plan generator 509 and query plan executor 519. Query plan generator 509 responds to an information access description 501 from KBS 109 which contains site descriptions 201 by generating a query plan 511 which is made up of a number of subplans 512. Each subplan 512 is sent in turn to query plan executor 519. Query plan executor 519 executes the current subplan 512 by producing subquery protocol 525 for querying the information source 123 specified in current subplan 512. When the protocol is executed, it returns subquery results 523 and additional information 517 to query plan executor 519, which retains subplan results 523 and returns additional information 517 to query plan generator 509, which then prunes the remaining subplans 512 on the basis of the additional information. When all of the necessary subplans have been executed, the retained subquery results 523 go to graphical user interface 103 as query results 521.

In a presently-preferred embodiment, the additional information is treated as a constraint which applies to subplan result 523. That constraint is then applied to the concept for which the subplan was retrieving instances. If query plan 511 has unexecuted subplans 512 which include that concept and a constraint which is mutually satisfiable with the constraint defined by the additional information, those unexecuted subplans 512 may be pruned from query plan 511.

Improved User Interface

The following is a detailed description of the improvements in the user interface 103 of system 101. The improved user interface 103 is described in conjunction with FIGS. 6 through 8.

The improvements in user interface 103 are described in connection with one embodiment of the invention in which the information retrieval system 101 is a WWW client. Thus, this detailed description will begin with a brief description of hypertext navigation and interpretation of hypertext links, which are operations common to all interactive WWW clients.

Figure 6:
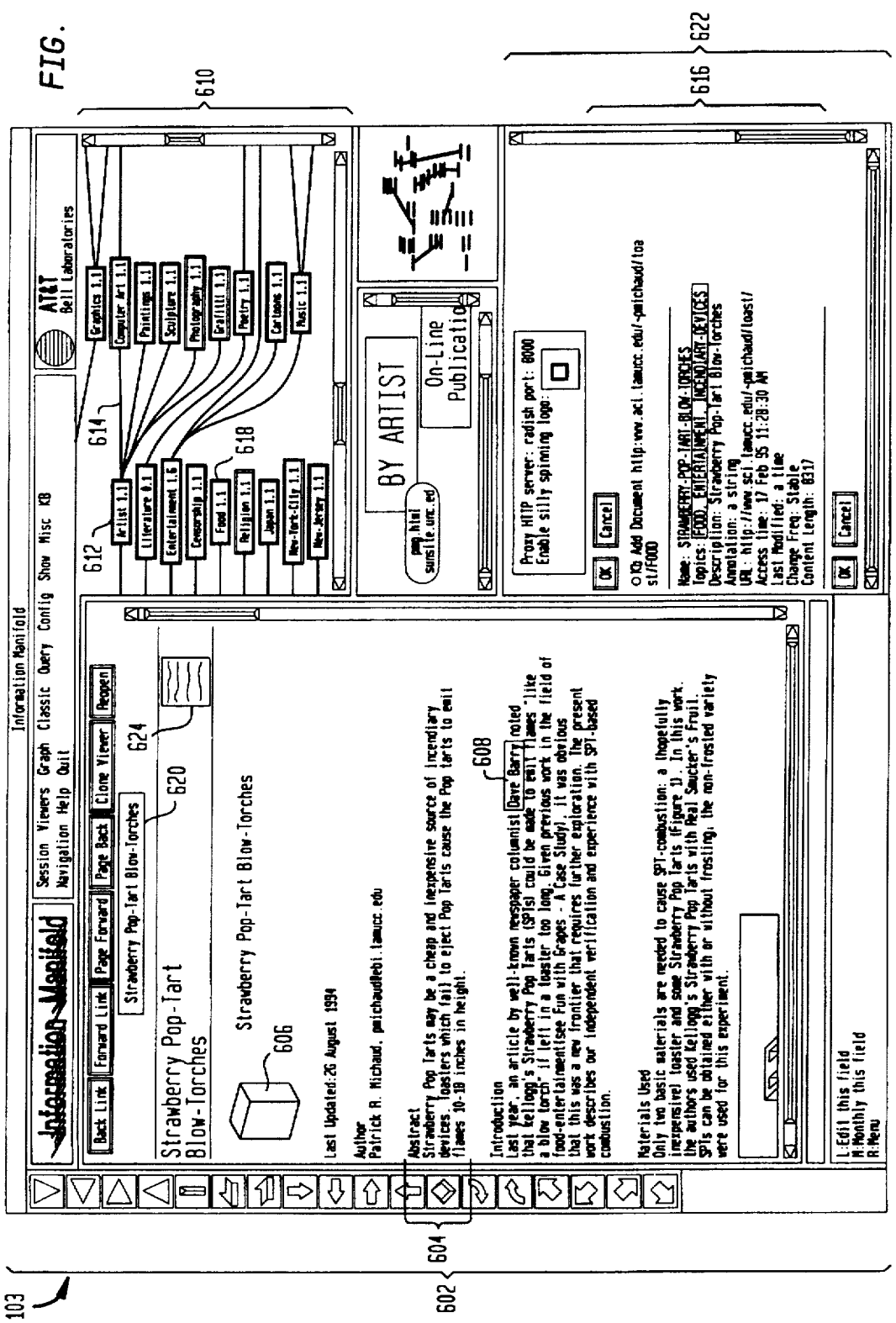
FIG. 6 shows a first screen display of a preferred embodiment of the user interface in accordance with the present invention.

As shown in FIG. 6, the improved user interface 103 includes a hypertext browser 602 that supports the presentation of, and interaction with, hypermedia WWW documents. Upon retrieval of a hypertext document by the system 101, the hypertext browser 602 formats and displays the document as a mixture of text 604, graphics 606 and hypertext links 608. The displayed hypertext links 608 have a different appearance (e.g. different color, underline, italics) to distinguish them from the rest of the text in the document.

The hypertext browser 602 allows user interaction with these hypertext links 608 by attaching semantics to the action of selecting a hypertext link with a graphical pointing device, such as a mouse, and performing a gesture, such as depressing the mouse button. Since the hypertext link 608 represents another information source, the result of selecting a hypertext link is to retrieve the object associated with the link. Such an object may be another hypertext document or some other media type like sounds, images, or movies.

We use the term information source broadly to describe a variety of entities that convey some type of information. A particular specialized type of information source is a single document. In the following detailed description we will sometimes refer to documents as specific, commonly used instances of information sources. These documents may be hypermedia documents that include graphics, audio, animation, and hypertext links to other information sources. Other examples of information sources include collections of documents (e.g. directories or databases) and information servers that provide access to collections of other information sources.

The hypertext link 608 displayed by the hypertext browser 602 has an associated Universal Resource Locator (URL) that encodes the location and access method for the document to be retrieved. To process a retrieval operation, a link interpreter 130 (FIG. 1) decodes the URL to determine how to connect to information sources 123 and request the document. The first part of the URL encodes the protocol that is used to communicate with the server on which the document resides. The second part of the URL is the network name or network address of the server. The remainder of the URL is the pathname or query that uniquely identifies the document to the server. Having determined the communication protocol, the link interpreter 130 passes the server name and pathname or query that refers to the document to the appropriate information access protocol interface 121. Each information access protocol interface 121 implements a single network protocol for establishing communication with the server and retrieving the document.

Upon successfully retrieving a document, it is interpreted and formatted for display in the hypertext browser 602. Interpretation of the document includes identification of embedded hypertext links, so that the hypertext browser 602 can display these links with the visual indications and interactive behavior described above.

The above described hypertext navigation, interpretation of hypertext links, and document retrieval based upon hypertext links is well known and could be readily implemented by one of ordinary skill in the art.

In one embodiment of the present invention, the user interface 103 is connected to the CLASSIC knowledge representation system (knowledge base) 109 (FIG. 1), which is the medium for storing information source descriptions. The system 101 uses information source descriptions 113 to represent information sources. These information source descriptions 113 are represented by the system in terms of knowledge base 109 objects. An information source description is composed of relevant attributes of an information source. The information source description can be used to query the knowledge base 109 and to permit access to and retrieval of the information it describes. Specific examples of the attributes included in information source descriptions include properties such as the type of information (e.g. formatted text, graphical image), the size (content length) of the document, the time that the information was last modified, and the times that the information was accessed. These attributes can generally be determined with no understanding of what the information is about. In addition, the information source description includes attributes that represent the semantic content of the information, such as a topic attribute that indicates what the information is about. In general, attributes relating to the semantic content of the information require some understanding of the content of the information and may not be extracted fully automatically.

This latter class of attributes, which indicate the semantic content of an information source, establish the relationship between information sources and concepts in the world view 115. The world view 115 comprises concepts that are primarily meaningful to users. The most commonly used concepts in the world view are the topics that are used to describe aspects of the semantic content of an information source. These topics are related to each other in a generalization taxonomy. The user will often wish to browse or query the knowledge base 109 in terms of these world view 115 concepts (i.e. finding a set of information sources about a particular topic). These browsing/querying operations can take advantage of the taxonomic organization of the topic concept to progressively generalize or specialize an examination of the information sources represented in the knowledge base, and will be described in further detail below. Attributes related to extrinsic properties of information sources, such as network addresses and access methods, establish the relationship between information sources and concepts in the system/network view 117.

The CLASSIC knowledge representation system 109 has been described in detail above, in conjunction with the description from the parent application, and will be further described here only insofar as it relates to the improved user interface 103 of the present application. CLASSIC is a description logic-based system, operating in terms of structured, object-centered descriptions of concepts and their instances. CLASSIC performs inferences of subsumption and classification to automatically organize concepts into a generalization taxonomy, as well as classifying individual objects under all appropriate concepts. It also provides a rule mechanism for forward-chaining deductions. The expressiveness of CLASSIC's description logic is designed to ensure that inferences can be done with polynomial cost.

Figure 7:
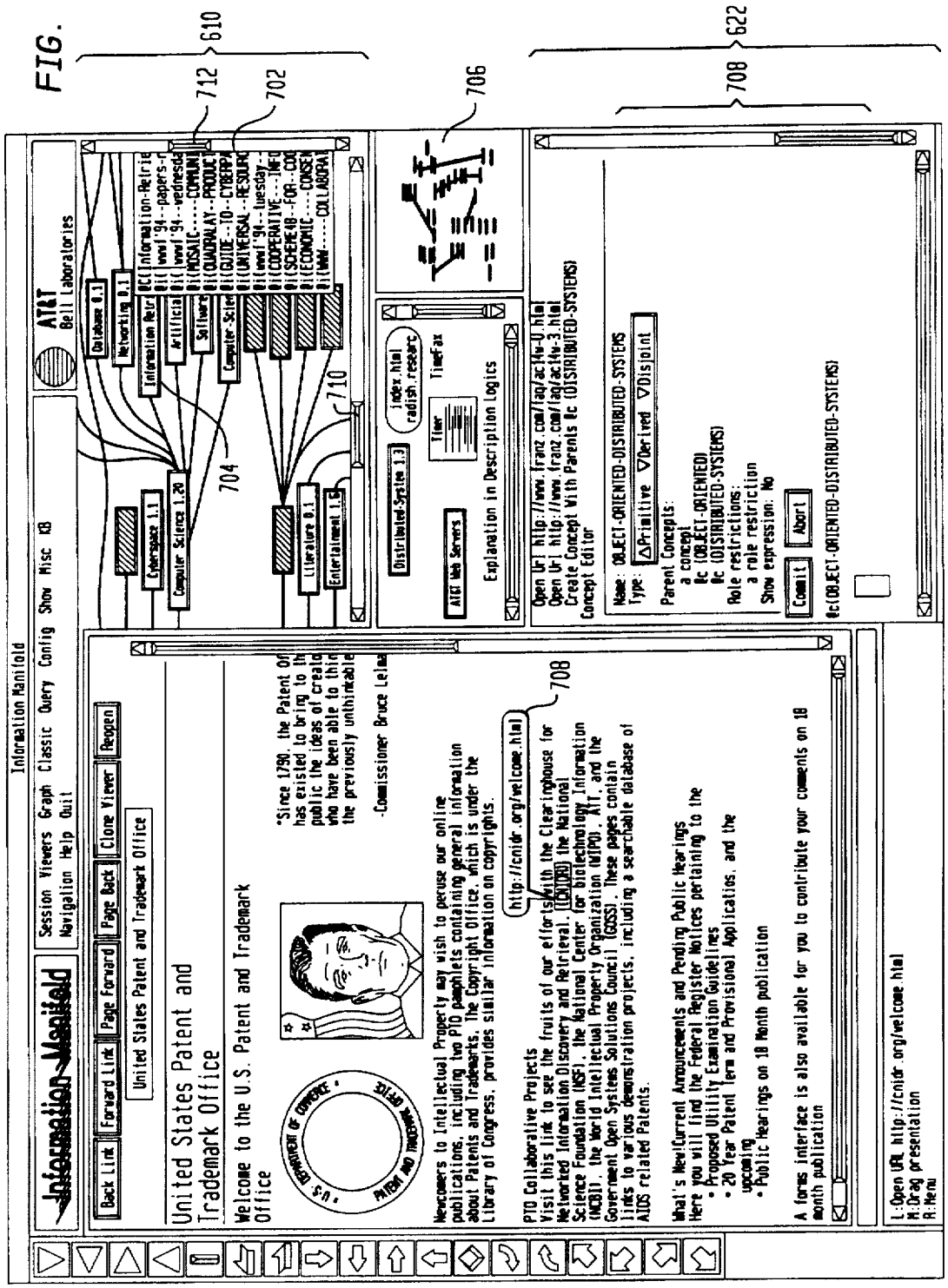
FIG. 7 shows a second screen display of a preferred embodiment of the user interface in accordance with the present invention.

The CLASSIC knowledge representation system 109 includes facilities for extending the knowledge base by adding to and refining the domain model 111. As new information sources are discovered and new information source descriptions are added to the knowledge base 109, the user's view of the world may change, so the system supports the addition of new concepts and relationships by providing a concept editor 708 (FIG. 7) that is invoked from the user interface 103. The concept editor 708 is instantiated in the lower right portion of the display screen as shown in FIG. 7. This area of the display screen is called the command window 622. The command window 622 is where a user enters textual commands that cannot be expressed as pointer gestures on display objects. In addition, many of the pointer gestures on display objects translate directly to commands, so the command window 622 also displays those commands that result from performing mouse pointer operations. The command window 622 also serves as an interaction history, since it maintains a record of all previously executed commands.

The concept editor 708 provides a form interface for creating new CLASSIC concept descriptions. The fields in the form include the name of the concept, the type of concept (one of primitive, derived, or disjoint-primitive), the parent concept(s), and any additional role restrictions. Editing operations on these fields do not affect the contents of the knowledge base 109. The knowledge base 109 is changed only when the user confirms creation of the concept with an explicit commit operation, at which time the concept is created and classified. Aborting the concept editor leaves the knowledge base unchanged. When new concepts are created, CLASSIC's classification inferences correctly determine all descriptions that satisfy the membership restrictions of the new concept.

The use of a knowledge representation systems like CLASSIC assists the user in the task of organizing the information retrieved from various information sources. By entering an information source description in terms of concepts in the knowledge base 109, the system automatically (through classification) determines where to place the information source description in the taxonomy. Since information source descriptions may include many attributes, this automatic inference step is nontrivial and useful, as a given information source description may be classified under more than one concept.

Referring to FIG. 6, the user interface 103 includes a hypertext browser 602 and a knowledge base browser/editor 610. The hypertext browser 602 is functionally similar to other currently existing WWW browsers. The knowledge base browser/editor 610 presents a graphical view of the world view 115 portion of the knowledge base 109 to the user. Navigation of the information space can be done using either the hypertext browser 602 or the knowledge base browser/editor 610. The user interface 103 supports both navigation paradigms by allowing the user to conveniently switch between them as appropriate.

The knowledge base browser/editor 610 displays the world view 115 concepts as a generalization taxonomy. The relationships among concepts are represented as a directed graph, in which the nodes, e.g. 612, represent concepts and the edges, e.g. 614, represent ancestor/descendent subsumption relationships between the concepts. One function of the knowledge base browser/editor 610 is to provide the user with an organized overview of the concepts in the world view 115 of knowledge base 109. Concepts outside the world view 115 are filtered from the display to reduce and simplify the amount of information that the interface 103 presents to the user.

As discussed above, when a user finds interesting information from the information sources 123, the user may want to save information source descriptions in the knowledge base 109 to expedite future access to the information. These information source descriptions are added to the knowledge base 109 by creating descriptions of them in terms of the domain model 111. When a new information source description is to be created, the user interface 103 provides a knowledge base object editor 616 to guide the user in populating the description.

The knowledge base object editor 616 that is instantiated when adding an information source description to the knowledge base 109 presents a modifiable template of an information source description, expressed as attribute-value pairs. There is one of these pairs for each attribute of an information source description, with an editable field for the value(s) to be assigned to that attribute. The knowledge base object editor 616 shown in FIG. 6 includes the attributes: Name, Topics, Description, Annotation, URL (access path), Access time, time Last Modified, Change Frequency, and Content Length. To minimize the effort of adding new information source descriptions to the knowledge base 109, the system supports this process by automatically extracting certain attributes from the retrieved document and populating the appropriate fields of the knowledge base object editor 616. This process is advisory in the sense that the user has an opportunity to modify or replace the values suggested by the system before the object is added to the knowledge base. In the example shown in FIG. 6, the system is able to automatically provide fillers for all values except for the Topics and Annotation attributes. The knowledge base object editor 616 is used to modify the system determined attributes or to add other attributes that cannot be correctly determined by the system. For example, it is the responsibility of the user to provide fillers for the Topics attribute of an information source. Additional assistance for automatically creating or suggesting fillers for these user-determined attributes is described below. When the attribute values are satisfactory, the user concludes the editing process by committing the creation of the new information source description in the knowledge base, at which point a new object is created and classified. Alternatively, the knowledge base object editor 616 allows the process to be aborted at any point, in which case no object is added to the knowledge base 109. The knowledge base object editor 116 may also be used to modify or add to existing information source descriptions already stored in the knowledge base. In this case, a new object will not be created when the edits are committed, but the object may be reclassified. If the edit is aborted, no changes are made to the object or the knowledge base. The knowledge base object editor 616 is instantiated in the command window 622 (discussed above).

One way in which the task of adding information source descriptions to the knowledge base is supported is by using the drag/drop paradigm. In this technique, a user uses a pointing device, such as a mouse, to select, drag, and drop an iconic representation of an object. In the user interface 103, a user can pick an iconic representation of a document from the hypertext browser 602, drag it into the knowledge base browser 610, and drop it on a node, e.g. 618, which represents a topic concept. The iconic representation of a document may be, for example, a hypertext link 620, which is an active display element representing the document, or some other iconic representation 624 of the document displayed in the hypertext browser 602.

For example, as shown in FIG. 6, the user would point to either the hypertext link 620, or other iconic representation 624, both of which represent the document currently displayed in the hypertext browser 602. If the user dragged either hypertext link 620 or other iconic representation 624 to the Food node 618 in the knowledge base browser/editor 610, it would indicate that the user wanted to store an information source description of the document in the knowledge base 109 related to the topic Food. This drag and drop action causes the knowledge base object editor 616 to be instantiated in the command window 622. The Topics Attribute will be populated with the Food concept, as a result of the user dragging the icon 620 or 624 to the Food node 618 in the knowledge base browser/editor 610. As discussed above, the system determined attributes, such as URL, Access Time, Content Length, Last Modified, and Change Frequency, are automatically populated by the system.

In the case where the user wishes to associate only a single topic with the information source description, in this example Food, the process of adding the information source description to the knowledge base 109 can be done quickly with only a small number of pointer gestures (i.e. without keyboard interaction). More sophisticated descriptions require additional user interaction through the knowledge base object editor 616. For example, if the user wanted to associate the document with other topics, such as Entertainment, and Incendiary Devices, the user would edit the Topics attribute of the information source description in the knowledge base object editor 616 prior to committing the information source description to the knowledge base 109.

Another way in which the system supports addition of information source descriptions to the knowledge base 109 is by providing an automatic information extractor 132 (FIG. 1) which automatically associates the contents of a document with concepts in the world view 115 portion of the domain model 111. This is done by consulting a mapping of textual regular expression patterns to world view 115 concepts. When a document is to be added to the knowledge base 109, the automatic information extractor 132 matches the regular expression patterns against the document text. For patterns that match, the mapping is consulted to find the concept(s) associated with that pattern. The concepts resulting from this matching process are presented to the user as possible choices for the attribute to which they apply. For example, the patterns could be keywords that relate to the topical content of a document, so the matching process produces a list of possible fillers for the document's Topic attribute. This information is presented to the user through the knowledge base object editor 616 on an advisory basis, since the matching process is necessarily incomplete and the mapping may not necessarily be reliable due to the limited expressiveness of the regular expressions. The user has the opportunity to edit the attributes using the knowledge base object editor 616 prior to storing the information in the knowledge base 109. The matching process of the automatic information extractor 132 is intended to assist the user in determining appropriate concepts for describing the document, but the ultimate control and responsibility for specifying these concepts remains with the user.

The knowledge base 109 serves not only as a repository for data about information sources but also as a medium for browsing and querying. That is, retrieval and display of documents can be initiated from the knowledge base browser/editor 610, rather than relying solely on the hypertext browser 602.

The query language used to query the knowledge base 109 is essentially the same as the CLASSIC language for expressing concept descriptions, with some additional operators to express operations and restrictions that cannot be stated within CLASSIC's description logic. CLASSIC allows additional restrictions by providing for test-functions in the description. These test-functions may have arbitrary code to establish membership within a concept description. A query states restrictions in terms of concepts and individuals in the knowledge base that circumscribe a collection of documents.

When a query is posed to the system, the query translator 107 (FIG. 1) converts the query syntax into a CLASSIC concept description, which is the canonical form of the query used by the CLASSIC knowledge representation system 109 for evaluation. Query language operators that cannot be expressed in terms of CLASSIC's description logic are transformed into executable code that is encapsulated in a CLASSIC test-function, which also becomes part of the concept description. After translation of the query to a CLASSIC expression, this canonical form is parsed and normalized to form an unnamed temporary concept. The final step in evaluating the query is to request the instances (CLASSIC individuals) of this temporary concept. This list of instances is formatted and displayed to the user as the query result.

One mode of retrieval from the knowledge base 109 is browsing, which is a special case of querying that encapsulates a common knowledge base query in a single command that is invoked using a pointer gesture in the knowledge base browser/editor 610. For example, referring to FIG. 7, clicking a mouse button on node 704, which represents the "Information Retrieval" concept in the knowledge base 109 implies a query to find information source descriptions in the knowledge base 109 that have at least one topic that classifies under the "Information Retrieval" concept (i.e. a topic that is a direct instance of this concept or one of its descendants). The result of such a browsing operation is to display a list 702 in the knowledge base browser/editor 610, of knowledge base objects representing the information source descriptions that satisfy the query. The displayed list 702 of knowledge base objects in the knowledge base browser/editor 610 is interactive in the sense that the user can perform a single mouse gesture on one of these objects to retrieve the actual document associated with the information source description represented by the pointed to object using access path information associated with the object. Thus, documents associated with the list of displayed knowledge base objects 702 may be retrieved and displayed in a manner similar to that described above in connection with hypertext links in the hypertext browser 602.

For queries that cannot be expressed in terms of the above described graphical browsing operations, the user has access to the full query language for describing more complex restrictions on collections of documents. An example of such a query, paraphrased in English, might be "find documents with at least one topic under science that have not been accessed since January 1". The user enters these queries in the textual command window 622, discussed above, of the user interface 103. The result of such a query is a list of objects representing documents. As with the browsing mode of querying, the query result is presented to the user as an interactive list of knowledge base objects, so that individual documents in the collection can be retrieved by a pointer gesture on its displayed representation.

By using the CLASSIC description language as the canonical form of a query, the system enables the user to organize and save queries in the knowledge base 109 for later reuse. This gives the user a convenient way to execute idiomatic or frequently stated queries. The query is saved by converting the intermediate form of the query, an unnamed temporary concept, into a named concept. Creating a named concept makes the query a permanent part of the knowledge base 109. As with any other concept, these query concepts are classified into an appropriate position in the generalization taxonomy, so the knowledge base 109 assists not only in storing the queries but also in organizing them (i.e. the knowledge base can recognize that one query is a generalization of another). These queries may be displayed in the knowledge base browser/editor 610 to visually show the relationships between them. Since the query is concisely represented as a named object in the knowledge base 109, subsequent execution of the query can be expressed with a single browsing operation as described above in connection with knowledge base browsing.

Some of the interactions between the hypertext browser 602 and the knowledge base 109 occur implicitly as a side effect of another operation, such as hypertext browsing. The system keeps track of hypertext browsing operations that might affect data stored in the knowledge base 109. Such interactions are transparent to the user, as opposed to explicit interactions initiated by the user, such as adding a document to the knowledge base. An example of such an implicit interaction is based on the access time of a document. If, while browsing the WWW, the user encounters a document for which an information source description has previously been stored in the knowledge base, the system will note this by automatically updating the Access Time attribute of the document's information source description in the knowledge base. Other information source description attributes which may be implicitly updated in the manner include Content Length and Last Modified.

The user interface includes a shelf 704, which is an area on the display which functions as a multimedia scratchpad for storing interactive screen objects for later use. Any pointer sensitive object in the display (e.g. hypertext link 708 from the hypertext browser 602, concept nodes 618 (FIG. 6) from the knowledge base browser/editor 610, etc.) can be picked up and dragged into the shelf 704, thus creating a copy of the object. The items placed in the shelf 704 retain their original interactive behavior. For example a hypertext link copied to the shelf 704 can be clicked on to retrieve a document just as it could when the same gesture was performed on the hypertext link in the hypertext browser 602.

The user interface 103 also includes a knowledge base overview browser 706, which provides a birds-eye view of the directed graph displayed in the knowledge base browser/editor 610. This knowledge base overview browser 706 provides the user with an alternative view of the entire knowledge base concept graph, which is typically too large to fit entirely within the visible portion of the knowledge base browser/editor 610.

The user interface 103 also includes a path history browser 800, which is shown in FIG. 8. This path history browser 800 displays an interactive graphical history of which information sources the user has visited during a session. The nodes, e.g. 802 in the path history browser 800 represent information sources (e.g. documents) that the user has visited (i.e. retrieved and displayed in the hypertext browser 602), with the edges, e.g. 804, representing the hypertext links between them. The user can interact with this history by clicking on the nodes, which returns the hypertext browser 602 context to the information source associated with that node.

Combining Structured And Unstructured Data Sources

The foregoing detailed description of the improved user interface 103 described a user interface embodied in a WWW browser. The information sources in the WWW are generally classified as unstructured data sources, in that the data is not organized in a structured manner. In order to find information on the WWW, a user browses the information space using the hypertext browser 602. Each document displayed in the hypertext browser may contain pointers, or hypertext links, to other related documents. In this manner, the user navigates the WWW to find useful information. When useful information is found, the user may save an information source description in the knowledge base 109 as described above.

The detailed description of the parent application, U.S. patent application Ser. No. 08/347,016, which was substantially included at the beginning of the application, describes the retrieval of information from a plurality of information sources, which sources are generally classified as structured data sources, in that the data is organized in some structured manner (e.g. a relational database). Information is generally retrieved from a structured data source by means of a query on the database, rather than by browsing.

Another aspect of the present invention is the integration of such structured and unstructured data sources as described below.

There are several ways in which structured and unstructured data sources can be combined to provide for an improved information retrieval system.

The user interface 103 can use the context of the knowledge base browser/editor 610 to help formulate a query.

The answer to a query can be a set of points to start browsing, or, more generally, can be presented as a hypertext document with explanations of the answers and pointers for further browsing.

A more principled combination of structured and unstructured information sources.

Each of these techniques is described in further detail below.

Using Browsing Context for Query Formulation

Suppose a user is browsing the knowledge base 109 using the knowledge base browser/editor 610, i.e., the user is at some point in the concept hierarchy. At this point, the user may want to pose a more specific query about the instances of that concept. The system can automatically insert a conjunct in the query that limits the answers to instances of the class. It can also suggest some role names for which the user may want to specify values or ranges.

For example, suppose one is browsing the knowledge base and is at the concept of AI-researcher. The user may be looking for those researchers in the class whose area of expertise is planning. Instead of posing the query AI-researcher(x) $\wedge$ expertise(x,planning), the user only specifies expertise=planning, and the system fills in the first conjunct of the query. Furthermore, the system may pop a menu for the user in which he can see the possible restrictions he can pose on AI-researcher, such as affiliation, expertise, etc.

Using Query Answers to Start Browsing

An answer to a structured query is essentially a list of tuples satisfying the query (as in relational databases). One or more attributes to these tuples may be a URL. This URL may be used to begin browsing in the unstructured data sources. For example, we may query for AI researchers, whose areas of expertise is planning, and the answer may be a set of tuples of the form (name, home-page-url). These tuples can be presented to the user as a hypertext document, including hypertext links, in the hypertext browser 602, and the user can then start browsing from there.

More generally, a tuple may be described to the user in a hypertext document. (In the examples which follow, the underlining indicates that the displayed text represents a hypertext link). For example, instead of displaying tuples such as:

| Bart Selman | AT&T Bell Labs | home-page |
| Oren Etzioni | University of Washington | home-page | we can display:

The known AI researchers whose area of expertise is Planning are:

Bart Selman whose affiliation is AT&T Bell Labs. Click here for his home page.

Oren Etzioni whose affiliation is U. of Washington. Click here for his home page.

Straightforward heuristics may be employed to generate the English phrases connecting the attributes.

A Principled Combination

We now describe a more general approach to answering queries that incorporates structured and unstructured information sources. We first illustrate the approach with an example, and then describe the general framework.

Suppose the query is DBConference(x,y,1995) $\wedge$Temperature(y,z). In words, the y is the city in which the database conference x is being held in 1995, and z is the average temperature in the city y (ignoring the specific month, for now).

We may have access to a structured information source (i.e., a database) that tells us where the database conferences are being held in 1995. For example it may contain the tuples.

| | | |
|---|---|---|
| SIGMOD | Washington D.C. | 1993 |
| SIGMOD | Minneapolis | 1994 |
| SIGMOD | San Jose | 1995 |
| VLDB | Dublin | 1993 |
| VLDB | Santiago | 1994 |
| VLDB | Zurich | 1995 |

However, we may not have access to structured information sources that provide the temperatures in specific cities. Instead, we have access to several unstructured information sources, which give textual descriptions to the weather, including the temperatures. However, these unstructured information sources do not have an internal structure that enables extraction of the temperature in a standard fashion. For example, we may have the unstructured sources:

California weather server

Switzerland tourist information server

San Jose city server

Trying to solve the first subgoal of our query will yield the two facts:

DBConference(SIGMOD, San Jose, 1995), and

DBConference(VLDB, Zurich, 1995)

and therefore, to answer the query, we need to solve the subgoals:

Temperature(San Jose, z), and

Temperature(Zurich, z)

At this point, we can use some background knowledge about the unstructured sources we have. For example, we can infer that the California weather server may contain, in an unstructured fashion, the temperature in San Jose. This is inferred because San Jose is in California and the concept of weather is very closely related to the concept of temperature. Similarly, we can infer that the Switzerland tourist information server will have weather information about Zurich, also in an unstructured fashion, because tourist information usually includes weather. Therefore, the system can display the following to the user:

The SIGMOD conference will be held in San Jose, Calif. in 1995, and the weather in San Joe can be found by clicking here (California weather server) or here (San Jose city server).

The VLDB conference will be held in Zurich, Switzerland in 1995, and the weather in Zurich can be found by clicking here (Switzerland tourist information server).

This example illustrates two things. First, the final answer to the query is not given by the system itself, but rather by the user browsing some relevant unstructured information sources. However, the system's query processor uses the structured sources used as much as possible to prune which unstructured sources will be browsed in order to complete the answer to the query.

In general, the framework can be described as follows. Suppose our query is of the form:

$$Q_1(\overline{X}_1) \wedge Q_2(\overline{X}_2) \wedge \ldots \wedge Q_n(\overline{X}_n),$$

where the $\overline{X}_i$'s are tuples of variables, and the $Q_i$'s are predicate names. For simplicity, assume that all conjuncts in the query except for the last one can be answered by structured sources.

Let $X_{n-1}$ be the set of variables that appear in one of the first n−1 conjuncts (i.e., $\overline{X}_1 \cup \ldots \cup \overline{X}_{n-1}$).

We first solve the first n−1 conjuncts of the query, that is, we obtain tuples of $X_{n-1}$ that satisfy the query (in our example, these variables were x, the conference name, and y, the city in which it is held). For each tuple t, we then consider the last conjunct of the query. Some of the variables in $X_{n-1}$ appear in that conjunct, therefore, for each tuple obtained for $X_{n-1}$, we obtain a partial instantiation of the last conjunct, which we denote by $Q_n(\overline{a}_t)$ (note, the tuple $\overline{a}_t$ contains elements from the tuple t and the variables from $X_n$ that do not appear in $X_{n-1}$). In our example, one such an instantiation would be Temperature(San Jose, z).

The conjunct $Q_n(\overline{a}_t)$ is given as input to a module that decides which unstructured sources are relevant to it. At the simplest, we can take the names occurring in $\overline{a}_t$ and the name of $Q_n$ and feed it to an information retrieval system (e.g., San Jose and weather in our example). Alternatively, we may simply check whether these names match the topics by which an unstructured source is described. A different possibility is to use some more sophisticated reasoning about the names occurring in the conjunct $Q_n(\overline{a}_t)$, to determine relevant sources (as illustrated in the example).

Therefore, for each tuple t we obtain a set of sources $s_t$. The answer presented to the user is the set of pairs (t, s), where $s \in s_t$.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the system of the invention is advantageously implemented using the CLASSIC knowledge base system, the principles of the invention are by no means restricted to that system. The invention may be implemented in other knowledge based systems, as well as other types of database systems which allow for storage of objects in a structured manner. For example, if an object oriented database were used, the nodes in a directed graph representation of the database would represent classes of information and the edges would represent relationships between those classes.

We claim:

1. An information retrieval apparatus for retrieving information and for managing said retrieved information, the apparatus comprising:

a structured database;

a document browser for displaying retrieved information;

a database browser for displaying a visual representation of the structure of said database;

means for requesting a transfer of information from said document browser to said database; and storage means responsive to said means for requesting for storing information source descriptions in said database, said information source descriptions including at least an access path description and a content description of said retrieved information.

2. The information retrieval apparatus of claim 1 wherein said visual representation of the structure of said database is a directed graph including nodes and edges, said nodes representing classes and said edges representing relationships between said classes and wherein, said means for requesting further comprises means for graphically representing a transfer of information from said document browser to a particular node in said directed graph; and said storage means further comprises means for storing said information source descriptions in said database based upon said particular node.

3. The information retrieval apparatus of claim 1 further comprising:

information retrieval means for retrieving information;

query generation means responsive to said database browser for generating a database query; and query execution means responsive to said query for retrieving information source descriptions from said database and for displaying an interactive list of said information source descriptions in said database browser;

wherein said information retrieval means is responsive to said interactive list of information source descriptions for retrieving information.

4. The information retrieval apparatus of claim 3 further comprising:

a textual query editor for modifying the query generated by said query generation means.

5. The information retrieval apparatus of claim 1 wherein said information source descriptions further include information access attributes, said apparatus further comprising:

information retrieval means for retrieving information; and attribute update means responsive to said document browser for updating said information access attributes in the database when information is retrieved by said information retrieval means.

6. The information retrieval apparatus of claim 1 wherein said document browser is a hypertext browser.

7. The information retrieval apparatus of claim 1 wherein said database is a knowledge base.

8. A user interface for an information retrieval system for managing information retrieved from a plurality of information sources, said information retrieval system including storage means for storing information source descriptions in a structured database, said user interface comprising:

a hypertext browser for displaying a retrieved document and an iconic representation of said document on a computer display screen;

a database browser for displaying a visual representation of said database on said computer display screen; and graphical pointing means for graphically representing a transfer of said iconic representation of said document from said hypertext browser to said visual representation of said database in said database browser;

wherein said storage means is responsive to said graphical pointing means for storing an information source description as an object in said database.

9. The user interface apparatus of claim 8 further comprising:

an object editor for textually editing said information source description object prior to storing it in said database.

10. The user interface apparatus of claim 9 further wherein said information source description object comprises attributes, the apparatus further comprising:

an automatic information extractor for automatically extracting information source description attributes from said retrieved document and for populating the object editor with said attributes.

11. The user interface apparatus of claim 8 wherein said database is a knowledge base including concepts relating to the information in said information sources, and wherein said visual representation displayed by said database browser is a directed graph with the nodes representing concepts and the edges representing relationships between said concepts, wherein:

said graphical pointing means further comprises means for graphically representing a transfer of said iconic representation of said document from said hypertext browser to a particular node in said directed graph;

wherein said storage means is responsive to said graphical representation of a transfer of said iconic representation to a particular node, for storing an information source description related to the concept represented by said particular node.

12. The user interface apparatus of claim 8 wherein said iconic representation is a hypertext link.

13. The user interface of claim 12 further comprising:

a scratchpad area for storing copies of original interactive screen objects, wherein said copies retain the interactive properties of the original objects.

14. The user interface of claim 8 further comprising:

query generation means responsive to said graphical pointing means for generating a database query in response to a user pointing to a portion of said visual representation of said database using said graphical pointing means;

query execution means for executing said generated query and for displaying query results on said computer display screen as an interactive list of information source descriptions, wherein said information retrieval system is responsive to a user pointing to one of said information source descriptions displayed in said interactive list for retrieving the information relating to said information source description and for displaying said retrieved information in said hypertext browser.

15. An information retrieval apparatus for satisfying a request for information by retrieving information from a set of unstructured data sources and a set of structured data sources, the apparatus comprising:

query execution means including query plan generating means responsive to a first query for generating a query plan and query plan execution means responsive to the query plan for retrieving query result information from at least one structured data source from said set of structured data sources;

pruning means for identifying a subset of said unstructured data sources using said query result information; and a text browser responsive to said pruning means for browsing said subset of unstructured data sources and for retrieving information responsive to said first query.

16. A method of organizing retrieved information in an information retrieval system, said method comprising the steps:

displaying a retrieved document and an iconic representation of said document in a text browser on a computer display screen;

displaying a graphical representation of a structured database in a database browser on said computer display screen;

storing an information source description of said document in said structured database in response to a user request, said structured information source description including at least an access path description and a content description.

17. The method of claim 16 wherein said database is a knowledge base including concepts relating to the semantic content of the retrieved document, and wherein said graphical representation displayed by said database browser is a directed graph with the nodes representing concepts and the edges representing relationships between said concepts, further comprising the steps of:

dragging said iconic representation from said text browser to a particular node in said directed graph.

wherein said step of storing further comprises the step of storing an information source description of said document related to the concept represented by said particular node.

18. The method of claim 17 further comprising the steps:

pointing to a particular node in said directed graph;

displaying in said database browser an interactive list of the information source descriptions which are instances of the concept represented by said particular node;

pointing to a particular information source descriptions in said interactive list;

retrieving a document represented by said particular information source description; and displaying said document in said text browser.

19. An information retrieval method for satisfying a request for information using a set of unstructured data sources and a set of structured data sources, the method comprising the steps:

generating a first query;

executing said first query and retrieving query result information from a structured data source;

pruning said set of unstructured data sources using said query result information to identify a subset of said unstructured data sources;

browsing said subset of said unstructured data sources with a text browser to retrieve information responsive to said first query.

20. Apparatus for adding information retrieved from a communications network to a body of information having an organization, the apparatus comprising:

a display of a representation of the retrieved information;

a display of a non-textual representation of the organization;

interactive means for moving the representation of the retrieved information to a portion of the non-textual representation; and means responsive to the interactive means for incorporating an information source description of the retrieved information into the body of information as specified by the portion of the non-textual representation to which the representation of the retrieved information was moved.

* * * * *